United States Patent
Lim et al.

(10) Patent No.: US 9,502,734 B1
(45) Date of Patent: Nov. 22, 2016

(54) FLEXIBLE BATTERY

(71) Applicant: Amazon Technologies, Inc., Reno, NV (US)

(72) Inventors: James Robert Lim, San Jose, CA (US); Yuting Yeh, Sunnyvale, CA (US); Erik Avy Vaknine, San Jose, CA (US); David Wang, Santa Clara, CA (US)

(73) Assignee: Amazon Technologies, Inc., Reno, NV (US)

( * ) Notice: Subject to any disclaimer, the term of this patent is extended or adjusted under 35 U.S.C. 154(b) by 82 days.

(21) Appl. No.: 14/223,146

(22) Filed: Mar. 24, 2014

(51) Int. Cl.
| | | |
|---|---|---|
| *H01M 10/00* | (2006.01) | |
| *H01M 10/04* | (2006.01) | |
| *H01M 2/02* | (2006.01) | |
| *H01M 10/39* | (2006.01) | |
| *H01M 4/13* | (2010.01) | |
| *H01M 10/64* | (2014.01) | |

(52) U.S. Cl.
CPC ....... *H01M 10/0436* (2013.01); *H01M 10/045* (2013.01); *H01M 10/0454* (2013.01); *H01M 2/0207* (2013.01); *H01M 4/13* (2013.01); *H01M 10/3972* (2013.01); *H01M 10/64* (2015.04)

(58) Field of Classification Search
CPC .... H01M 2/0207; H01M 4/13; H01M 10/04; H01M 10/045; H01M 10/0454; H01M 10/0583; H01M 10/64; H01M 10/3972
See application file for complete search history.

(56) References Cited

U.S. PATENT DOCUMENTS

| | | | |
|---|---|---|---|
| 5,507,965 A | 4/1996 | Padoy et al. | |
| 2006/0160000 A1* | 7/2006 | Kim ................. | H01M 10/0525 429/332 |
| 2009/0017380 A1 | 1/2009 | Honda et al. | |
| 2010/0055559 A1* | 3/2010 | Hirai ................. | H01M 10/0436 429/162 |
| 2011/0070493 A1 | 3/2011 | Gadkaree et al. | |
| 2011/0151323 A1* | 6/2011 | Song ................. | H01M 4/04 429/209 |
| 2012/0082870 A1 | 4/2012 | Yang | |
| 2013/0189602 A1 | 7/2013 | Lahiri et al. | |

OTHER PUBLICATIONS

Author Unknown, "Batteries & Energy Storage Technology," Exponent Engineering and Scientific Consulting, www.exponent.com, Available at http://www.exponent.com/batteries/ (2014).
Author Unknown, "Corning Willow Glass—Fact Sheet—Engineering Notes:," Available at http://www.google.com/url?sa=t&rct=j&q=&esrc=s&source=web&cd=2&ved=0CDIQFjAB&url=http%3A%2F%2Fwww.corning.com%2FWorkArea%2Fdownloadasset.aspx%3Fid%3D60313&ei=eBmVUvn3HsvjoASTsoLoCA&usg=AFQjCNEmGEhG5-OXJPm9Oiad_Kv5wqV3w&bvm=bv.57155469.d.cGE&cad=rja (2013).
Chen et al, "The fracture of brittle thin films on compliant substrates in flexible displays," Engineering Fracture Mechanics 69, pp. 597-603 (2002).
Lim, "Thesis: Electrolytes for Lithium Batteries," UCLA Materials Science and Engineering (2001).
Rogers et al, "Materials and Mechanics for Stretchable Electronics," Science vol. 327, pp. 1603-1607 (2010).

(Continued)

*Primary Examiner* — Patrick Ryan
*Assistant Examiner* — Ben Lewis
(74) *Attorney, Agent, or Firm* — K&L Gates LLP

(57) ABSTRACT

Various embodiments are directed to flexible battery structures comprising a flexible hinge region. For example, a flexible battery structure may comprise a plurality of battery layers. A first portion of the layers may be continuous across the hinge region and one or more cell regions. A second portion of the layers may be discontinuous at the hinge region.

18 Claims, 22 Drawing Sheets

(56) References Cited

OTHER PUBLICATIONS

Twiss et al., "Structural Geology," Ch. 12 Kinematic Models of Folding, pp. 238-261 (1992).

Wu et al, "Designing nanostructured Si anodes for high energy lithium ion batteries," Nano Today, vol. 7, Issue 5, pp. 414-429 (Oct. 2012).

* cited by examiner

FLEXIBLE BATTERY

BACKGROUND

As computing devices and other electronic devices have become smaller, thinner lighter, and more frequently incorporated into the active lifestyles of users, there has been an increased desire to improve the physical characteristics of the devices to better adapt to the lives of the users. For example, flexible devices provide many advantages to users including, an increased comfort during use, and a decreased risk of device damage. Accordingly, there is a need for flexible computing devices and flexible components thereof, including a flexible battery.

DETAILED DESCRIPTION

In the following description, reference is made to the accompanying drawings which illustrate several embodiments of the present invention. It is understood that other embodiments may be utilized and mechanical, compositional, structural, electrical operational changes may be made without departing from the spirit and scope of the present disclosure. The following detailed description is not to be taken in a limiting sense, and the scope of the embodiments of the present invention is defined only by the claims of the issued patent.

Various embodiments are directed to a flexible battery structure comprising a sheet of current collector material, an active layer, and an electrolyte layer. The active layer may comprise a plurality of active material portions separated on the sheet by slots. A first active material portion and a second active material portion, for example, may be separated by a first slot. In some embodiments, the slots comprise a first set of slots oriented in a first direction and a second set of slots oriented in a second direction substantially perpendicular to the first direction.

Also, various embodiments are directed to a flexible battery structure comprising a first cell region, a second cell region and a hinge region positioned between the first cell region and the second cell region. For example, the flexible battery structure may comprise a plurality of layers. A first portion of the plurality of layers may be continuous across the first cell region, the hinge region and the second cell region. A second portion of the plurality of layers may be discontinuous at the hinge region. For example, this may increase the flexibility of the battery structure at the hinge region.

Additionally, various embodiments are directed to battery structures with perceived flexibility. For example, a perceived flexible battery structure may be mounted within a device on a flexible structure, such as a set of struts or pillars. As the device flexes, the battery structure may remain substantially un-flexed, or flexed to a degree less than that of the device. Flexing of the device may be accommodated by the flexible structure.

Figure 1:
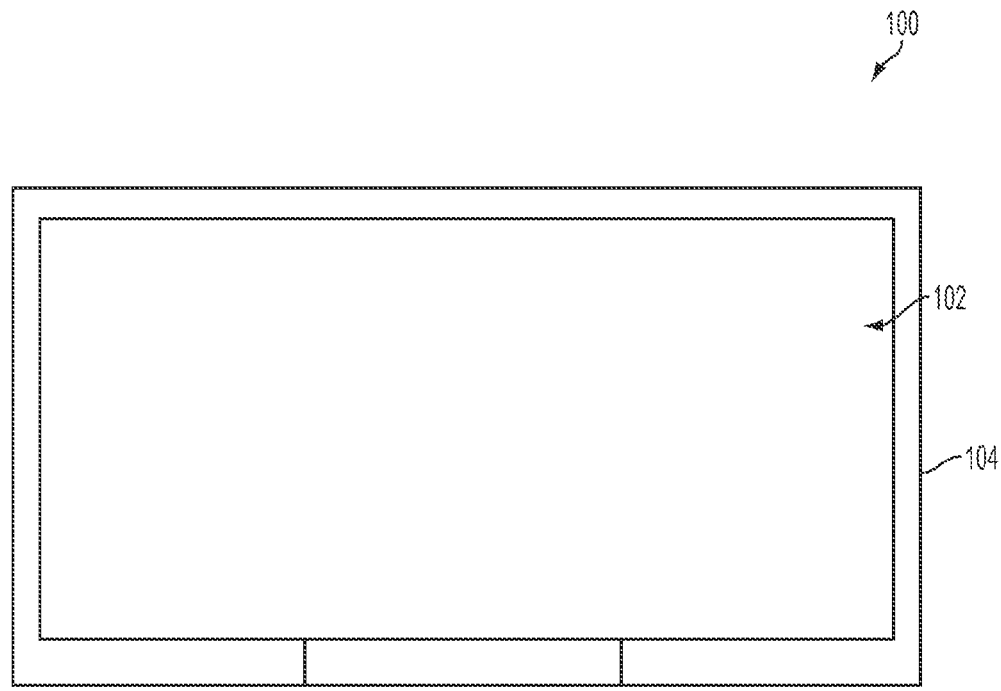
FIG. 1 shows one embodiment of a flexible computing device.
Figure 2:
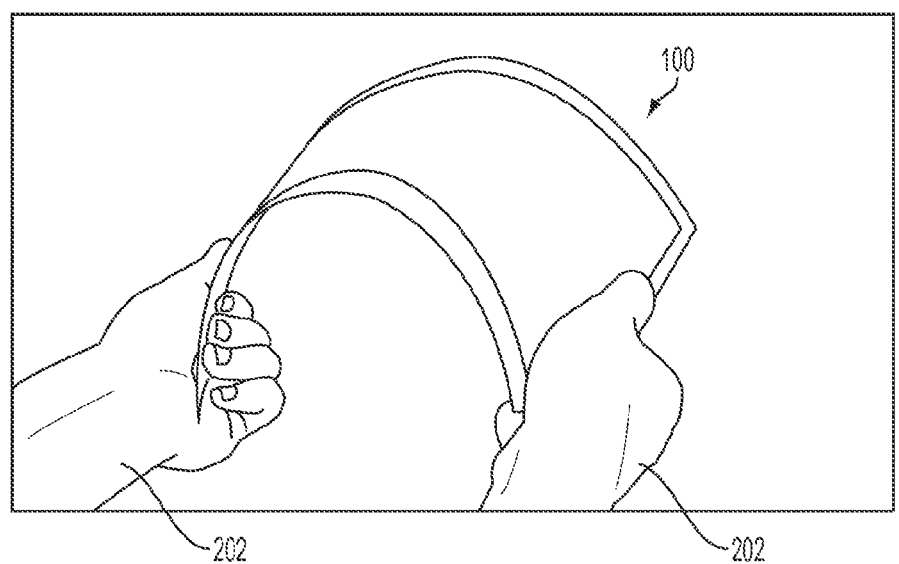
FIG. 2 shows a view of the flexible computing device of FIG. 1 in a pair of hands to demonstrate the flexibility of the device.

FIG. 1 shows one embodiment of a flexible computing device 100. In some embodiments, the device 100 may comprise a display screen 102. A frame section 104 may provide a user with a place to grip the device 100. FIG. 2 shows a view of the flexible computing device 100 in a pair of hands 202 to demonstrate the flexibility of the device 100. In some embodiments, the device 100 may comprise a processor and associated memory. It will be appreciated that the device 100 may have any suitable computing functionality. For example, the device 100 may comprise functionality for executing various applications or apps. In some embodiments, the device 100 may comprise functionality, and suitable components for communicating on a network, such as a wired or wireless data network, a cellular network, etc. To enhance its flexibility, the device 100 may utilize a battery or battery structures having flexibility enhancing features, for example, as described herein. It will be appreciated, though, that the flexible batteries and battery structures described herein may be used with any suitable computing or other electric device.

In various embodiments, a battery or battery cell is constructed from stacked layers, with the layers performing various functions in the battery. Cathode, anode and electrolyte/separator layers enable chemical reactions for storing and releasing electrical energy. During the release of electrical energy, ions are transferred between the cathode and anode layers, within an electrical potential difference. This potential or voltage difference may provide electrical power by driving an electrical current through a circuit. The electrolyte/separator layer facilitates ion transfer between the anode and cathode layers and also separates the anode and cathode layers so as to prevent direct electrical contact or shorts. The electrolyte/separator layer may comprise a single layer for performing both functions or separate electrolyte and separator layers. Some battery structures comprise additional layers. For example, current collection layers may be in electrical contact with the anode and/or cathode layers to release charge carriers when the battery is used in a circuit. Various adhesion layers may facilitate proper electrical and mechanical contact between the various components, such as between the active layers and the current collection layers. Packaging layers contain the other layers, which may include trilaminate layers, interlayers, sealant layers, etc.) while also preventing ingress of water, air and other contaminants from into the battery construct.

Figure 3:
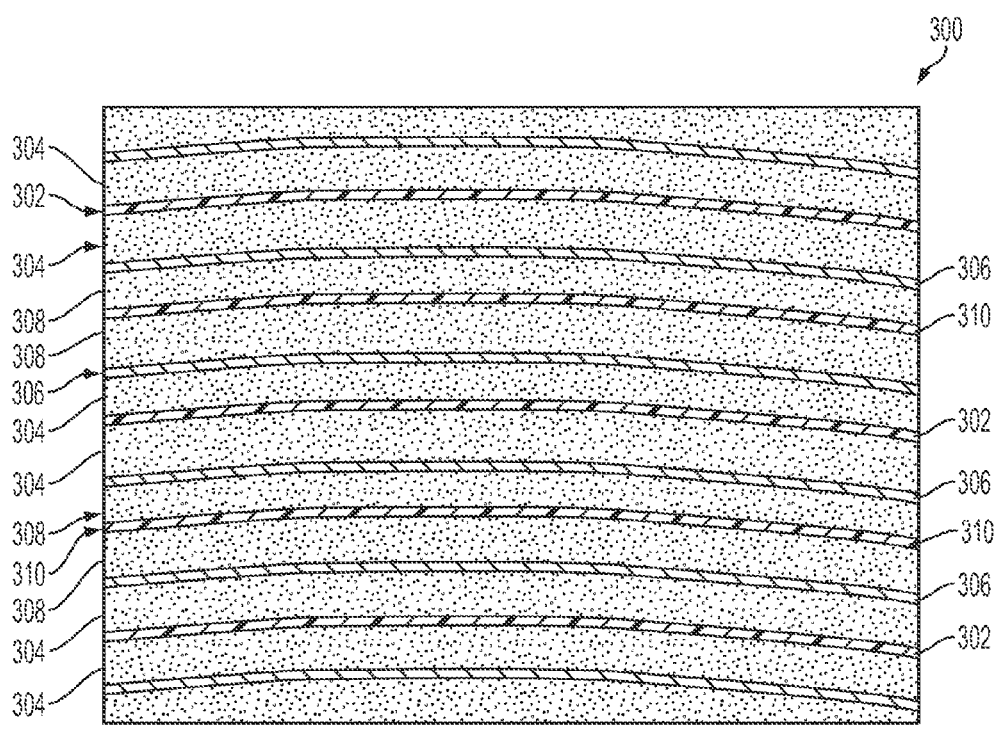
FIG. 3 shows a diagram showing one embodiment of a layered battery structure of a battery.

FIG. 3 shows a diagram showing one embodiment of a layered battery structure 300. The battery structure 300 forms a portion of a battery cell and, for example, may be positioned within a packaging layer or layers (not shown in FIG. 3). The battery structure 300 comprises active layers 304, 308, current collector layers 302, 310 and electrolyte/separator layers 306. The active layers 304, 308 may include cathode layers 304 and anode layers 308. The cathode layers 304 may be adjacent cathode current collector layers 302 while the anode layers 308 may be adjacent anode current collector layers 310. Electrolyte/separator layers 306 may be positioned between adjacent anode layers 308 and cathode layers 304.

The active layers 304, 308 comprise active materials selected to store chemical energy and facilitate electron-transfer reactions with corresponding ion-transport. The electrolyte/separator layers 306 may comprise electrolyte material selected to facilitate ion-transport between the active materials of the cathode and anode layers 304, 308. The electrolyte material may be rigid and/or have a compliant or gel consistency. For example, in some embodiments, the electrolyte/separator layer may comprise a matrix material infused with an electrolyte gel. In some embodiments, the matrix material is constructed from a flexible material such as glass fiber or various polymers.

Figure 11A:
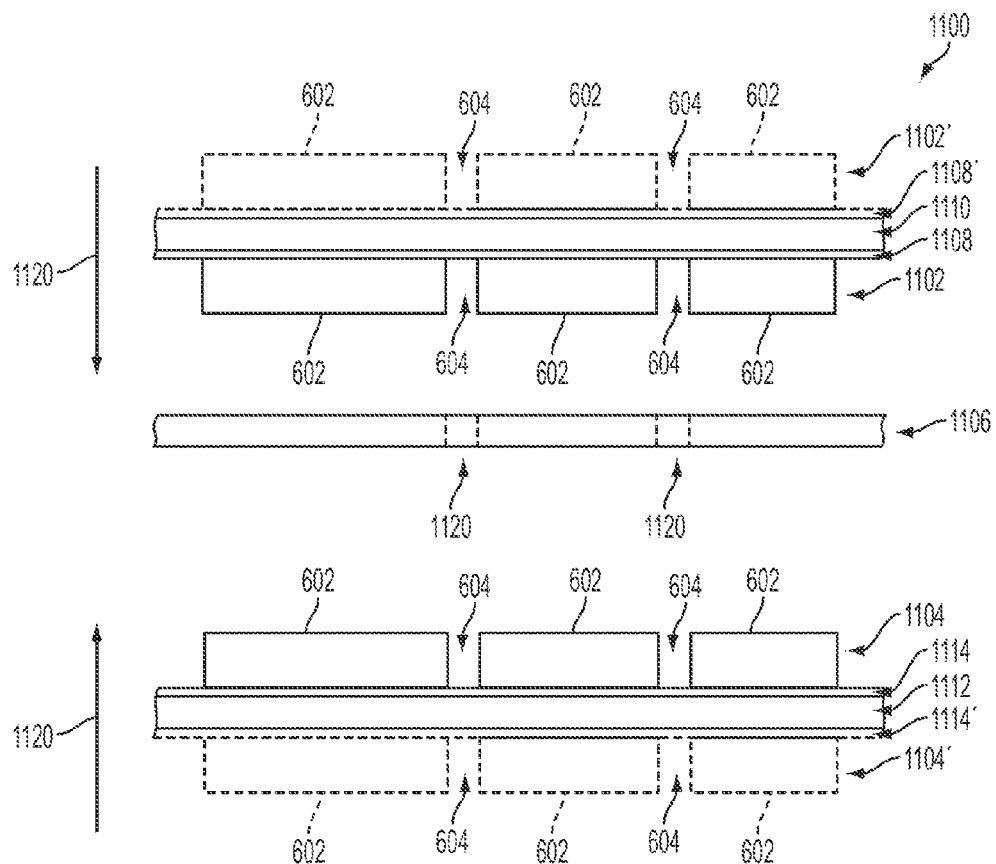
FIG. 11a shows a cross sectional view of one embodiment of a battery structure having patterned active layers.

The battery structure 300 is configured with multiple examples of each of the layers 302, 304, 306, 308, 310. The layers may be stacked upon one another and/or formed in sheet that is folded back upon itself into a wound or "jelly roll" configuration similar to the structure of a jelly roll pastry, and described in additional detail herein. In some embodiments, some or all of the current collector layers 302, 310 may have active material deposited on both sides. For example, cathode current collector layers 302, as illustrated, have adjacent cathode layers 304 on both sides. Similarly, anode current collector layer 310 may have adjacent anode layers 308 on both sides. In some embodiments, the battery structure 300 is formed by depositing the respective active materials on both sides of a sheet of current collector material, and then joining the sheets with the electrolyte/separator layer 306 there between, for example, as illustrated in FIG. 11a.

The composition and thicknesses of the layers 302, 304, 306, 308, 310 may vary based on battery chemistry. For example, the layers 302, 304, 306, 308, 310 may comprise various metals, polymers, gels, transition metal oxides, conductive carbon-based materials, composites thereof, etc. It will be appreciated that the flexible battery structures described herein may be used with any suitable battery chemistry. For example, battery structures according to different battery chemistries may utilize different active materials, electrolyte materials, and current collector materials.

In the example of FIG. 3, the battery structure 300 is configured according to a lithium-ion (Li-ion) or lithium-ion polymer (Li-ion polymer) battery chemistry. The cathode current collector layer 302 may comprise aluminum (Al) and may have a thickness of between about 10 microns and about 100 microns. For example, the cathode current collector layers 302 may have a thickness of about 25 microns. The cathode layers 304 comprise a cathode active material including lithium-containing compounds. For example, the active material of the cathode layers 304 may comprise a lithium-containing transition metal oxide compound, a lithium ion accommodating transition metal oxide compound, a mixed metal oxide compound, an intercalciation or insertion host compound material, etc. In some embodiments, the thickness of the cathode layers 304 is between about 25 microns and about 250 microns. For example, the thickness of the cathode layers 304 may be about 125 microns. The anode layers 308 comprise an anode active material that may include elemental lithium (Li) or carbon (C), for example, in the form of graphite. In some embodiments, the thickness of the anode layers 308 is also between about 25 microns and about 250 microns. For example, the thickness of the anode layers 308 may be about 125 microns. The anode current collector layers 310 may comprise copper (Cu) and may have a thickness between about 10 microns and about 100 microns. For example, the anode current collector layers 310 may have a thickness of about 25 microns. The electrolyte/separator layers 306 may comprise a solid electrolyte material and/or an electrolyte matrix infiltrated or activated with a liquid electrolyte, a gel electrolyte or combinations thereof. The electrolyte/separator layers 306 may be porous to facilitate the transport of ions between the anode and the cathode, but may also be electrically insulating so as to prevent electrical contact or shorting between the active materials of the anode and cathode layers. In some embodiments, thickness of the electrolyte/separator layers 306 is between about 5 microns and about 50 microns. For example, the thickness of the electrolyte/separator layers 306 may be about 25 microns.

Figure 4A:
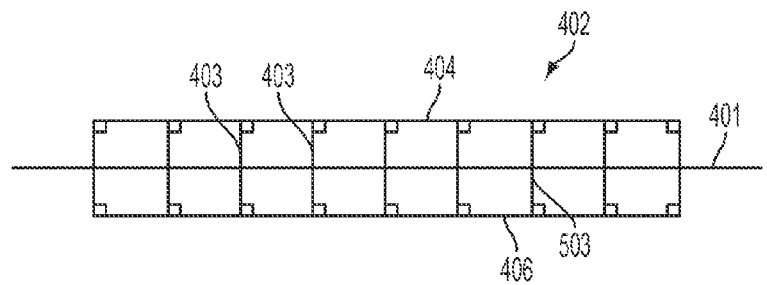
FIGS. 4a and 4b show one embodiment of an example battery structure illustrating orthogonal flexure.
Figure 4B:
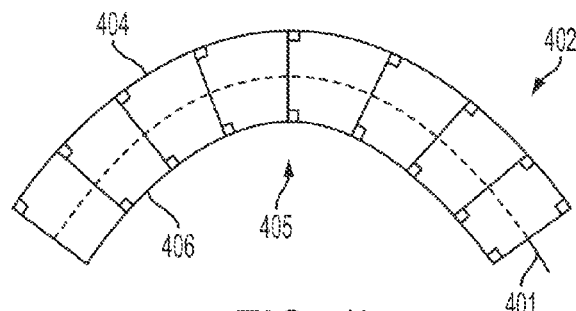

During flexing or bending, objects may experience tensile, compressive, and/or shear stresses. For example, a layered battery structure, such as the structure 300 of FIG. 3 may tend to experience orthogonal flexure and flexural shear. Orthogonal flexure occurs when the convex or outer surface of a structure is stretched while the concave or inner surface of the structure is compressed. FIGS. 4a and 4b show one embodiment of an example battery structure 402 illustrating orthogonal flexure. The structure 402 is illustrated with a neutral plane 401 and cross-sectional lines 403 meeting the outer (404) and inner (406) surfaces of the structure 402 at right angles. (The outer and inner surfaces 404, 406 are named relative to the direction of flexing shown in FIGS. 4a and 4b.) In FIG. 4a, the structure 402 is at rest. In FIG. 4b, the structure 402 is flexed. The flexing, as illustrated, places the surface 404 in tension while the surface 406 is placed in compression. The stress exerted on various portions of the structure 402, expressed as a force, is given by Equation (1) below:

$$F = \frac{EA_o \Delta L}{L_o} \quad (1)$$

In Equation (1), F represents the force exerted on the various portions of the structure 402. For example, on the outer surface 404, F represents the force of tension or stretching exerted by the material. On the inner surface 406, F represents the force of compression. E represents the Young's modulus of the material making up the structure 402. $A_o$ represents the original cross-sectional area of the structure 402. $L_o$ represents the original length of the structure 402. $\Delta L$ represents the change in the length of the structure 402 due to the flexing. For example, along the surface 404, $\Delta L$ will indicate that the length of the structure 402 along the surface 404 has increased (e.g., the surface is in tension). Along the surface 406, $\Delta L$ will indicate that the length of structure 402 along the surface 406 has decreased (e.g., the surface is in compression). As illustrated by Equation (1), bending strains in a battery structure, such as 402, decrease linearly as the cross-sectional area $A_o$ of the structure decreases. For example, cross-sectional area is often related to thickness, with thinner materials often having a smaller cross-sectional area.

As an illustration of the concepts of Equation (1), it is noted that glass is a material that tends to fail under bending stresses in manner similar to that of many brittle battery structure materials. A 200 micron glass sheet at a bend radius of approximately 16 centimeters has the same bend stress (100 Mpa) as a 100 micron thick glass sheet at a bend radius of about 4 centimeters. Equation (1), in conjunction with FIG. 4, also illustrates that farther a structure or portion thereof is from a hinge point, the less bend stress. For example, portions of the structure farther from the hinge point 405 experience a smaller change in length $\Delta L$.

Another illustration of this principle can be had by considering the elastic potential energy stored in a structure as a result of flexing. This value ($U_e$) is given by Equation (2) below:

$$U_e = \frac{EA_o \Delta L^2}{2L_o} \quad (2)$$

As illustrated, the elastic potential energy decreases linearly as the cross-sectional area $A_o$ decreases. Again, cross-sectional area often follows thickness such that thinner materials often have a smaller cross-section area and are, therefore, more flexible. Accordingly, reducing the original cross-sectional area ($A_o$) or thickness of all or a portion of a battery structure reduces the amount of elastic potential energy ($U_e$) stored in the structure. In some embodiments, the cross-sectional area of various structures may be reduced toward the nanometer scale to further improve flexing performance. For example, some battery structures include active materials for the anode and/or cathode layer that include nanowires or nanostructured morphologies. For example, an anode layer may be made from silicon (Si) nanowires. In these cases, the total elastic energy stored in nano-dimensioned materials may not be sufficient to cause crack initiation and propagation.

Figure 5A:
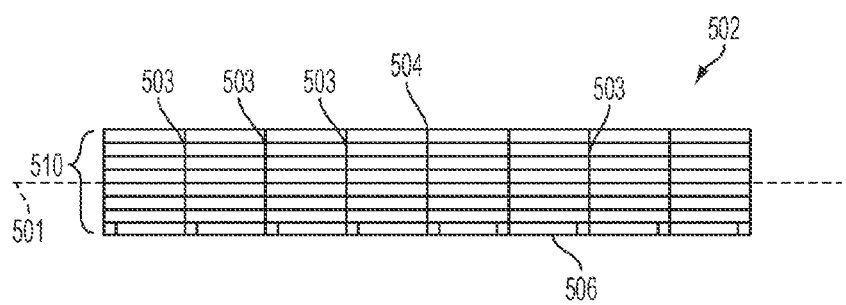
FIGS. 5a and 5b show one embodiment of a battery structure comprising a plurality of layers and illustrating flexural shear.
Figure 5B:
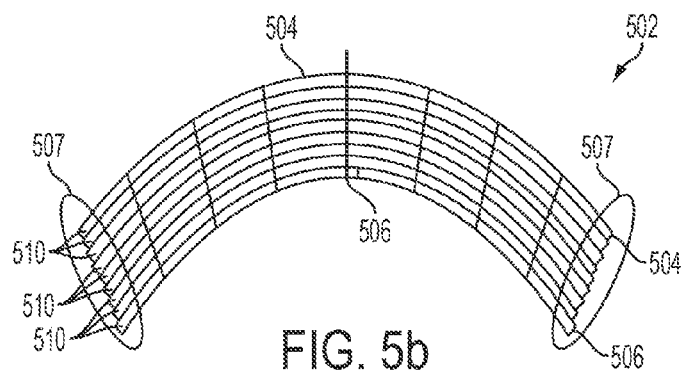

FIGS. 5a and 5b show one embodiment of a battery structure 502 comprising a plurality of layers 510 illustrating flexural shear. The structure 502 is illustrated with a neutral plane 501 and cross-sectional lines 503 meeting the outer (504) and inner (506) surfaces of the structure 502 at right angles. (Again, the outer and inner surfaces 504, 506 are named relative to the direction of flexing shown in FIGS. 5a and 5b.) As shown in FIG. 5b, when the structure is flexed about the hinge point, the different layers 510 are subjected to different forces in different directions. Flexural shear is the motion of the layers relative to one another in parallel to the neutral plane 501. As illustrated, flexural shear is sometimes detectable by the increase in edge distance from the outer layer 504 to the inner layer 506. The effect is detectable at the edges 507 of the battery structure. Also, as illustrated, the magnitude of the shear diminishes towards the hinge point and towards the neutral plane 501. Accordingly, it may be desirable to position the most brittle components and materials of lower compliance (stiff materials) near the center axis 501 in order to enable flexibility. The actual flexural shear between any given set of adjacent layers is proportional to the difference in F in the two layers, which may be found, for example, using Equation (1) above. Accordingly, it is based on the Young's moduli of the component materials, considering that the material with a higher modulus tends to take a disproportionate share of the load. When excessive, or when the battery structure is subjected to multiple bends, the force of flexural shear in a battery structure may cause the interfaces between different layers to fracture and/or delaminate.

Both orthogonal flexure and flexural shear can cause mechanical failure of a battery, or battery structure, often rendering the battery inoperable. For example, excessive forces due to orthogonal flexure can cause plastic deformation, cracking or other mechanical failure of battery materials. Excessive flexural shear can cause the layers of a battery structure to delaminate. Various embodiments described herein are directed to battery structures that can be flexed to smaller radii of curvature without the consequent stresses and strains causing mechanical failures.

In some embodiments, battery structures comprise patterned active layers to promote flexibility. For example, the active material making up anode and/or cathode layers may form active material portions separated by slots. The slots may be either left empty or filled with a material that is more flexible than the active material. FIGS. 6a through 6e show embodiments of patterned active layers 601, 603, 605, 607, 609. Each patterned active layer 601, 603, 605, 607, 609 comprises active material portions 602 and slots 604 there between. It will be appreciated that the active layers 601, 603, 605, 607, 609 may be anode layers or cathode layers, for example, based on the type of active material used. Accordingly, the respective active material portions 602 may be anode portions comprising an anode active material or cathode portions comprising a cathode active material.

Each of the patterned active layers 601, 603, 605, 607, 609 is illustrated in FIG. 6 as a flat sheet that may be combined with various other layers to form a complete battery structure, for example, as illustrated in FIG. 3 and further in FIG. 11a. In FIG. 6, the active layers 601, 603, 605, 607, 609 are illustrated as sheets parallel to the plane formed by the x-axis and the y-axis (the x-y plane). It will be appreciated that, in use, the active layers 601, 603, 605, 607, 609 and battery structures formed therefrom may be flexed away from a flat shape to a curved shape, for example, as described herein.

The active material portions 602 are made of appropriate active material (e.g., in a Li-ion cell, a lithium containing material for the cathode and carbon for the anode). Slots 604 may be empty and/or may be completely or partially filled with a flexible material. Material, if any, within the slots may be more flexible than the active material portions 602 by being more compliant (e.g., having an overall lower Young's modulus) and/or by being thinner than the active material portions 602. Examples of compliant materials that may completely or partially fill the slots 604 include electrolyte material from adjacent electrolyte layers. The electrolyte material may be an electrolyte itself, a gel a liquid in which the electrolyte is suspended, all or a portion of a matrix in which an electrolyte gel or liquid is suspended, etc. In some embodiments, when the electrolyte layers comprise a matrix material infiltrated with electrolyte material, the matrix itself may partially or completely fill the slots 604. In some embodiments, adhesive material from an optional adhesion layer positioned between the active material and an adjacent current collector layer may remain within the slots 604. Also, in some embodiments, the slots 604 may be partially filled with active material reflowed during the coating and drying process and left behind after densification, etc. Because the active material within the slots 604 may be thinner, and therefore have a smaller cross sectional area, than the active material portions 602, the slots 604 may be more flexible than the active material portions 602.

Figure 6A:
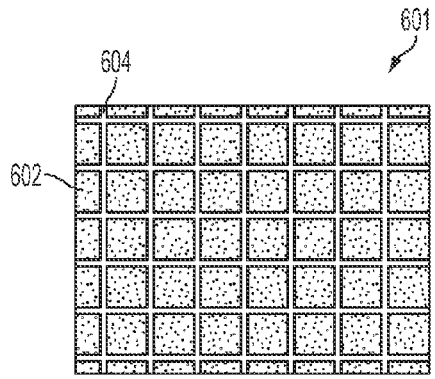
FIGS. 6a through 6e show example embodiments of patterned active layers.
Figure 6B:
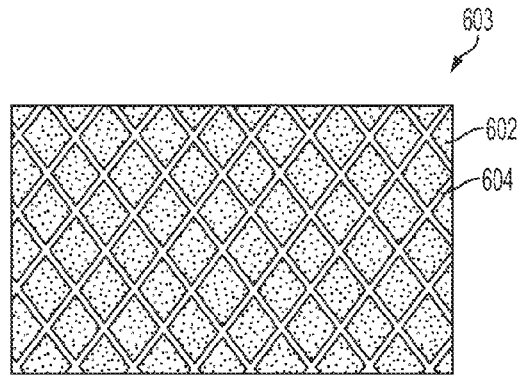
Figure 6C:
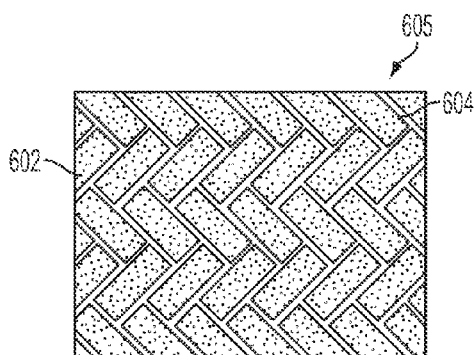
Figure 6D:
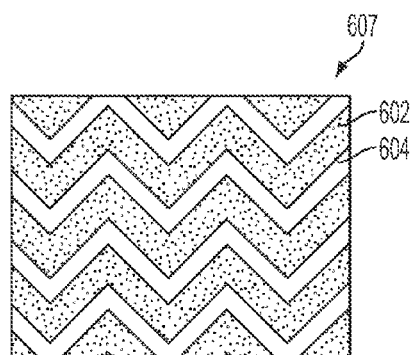
Figure 6E:
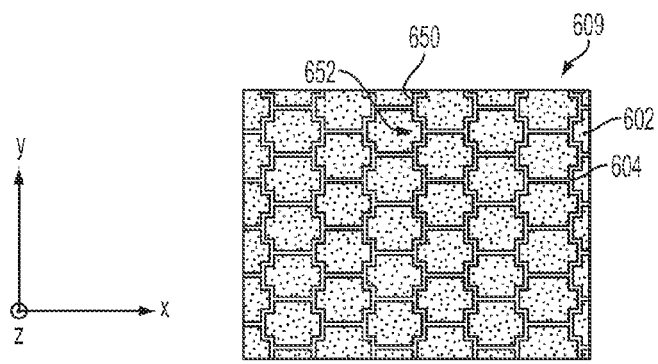

The active material portions 602 and slots 604 may be arranged in according to any suitable pattern. FIG. 6a shows slots 604 arranged according to a checkerboard pattern. For example, in FIG. 6a, various slots 604 intersect at right angles. A first set of the slots 604 are oriented in a first direction, and a second set of the slots 604 are oriented in a second direction substantially perpendicular to the first direction. It will be appreciated that the checkerboard pattern shown in FIG. 6a may be positioned on the active layer in any orientation. For example, the slots 604 may be parallel with the x-axis or y-axis as shown, or the pattern may be rotated. FIG. 6b shows a diamond pattern. In FIG. 6b, slots 604 do not meet at right angles. In the example of FIG. 6b, angles bisected by lines parallel to the y-axis are acute while angles parallel to the x-axis are obtuse. FIG. 6c shows the slots 604 arranged according to a herringbone pattern. For example, the active material portions 602 in FIG. 6c form a plurality of rectangles that are positioned oblique to one another. FIG. 6d shows the slots 604 arranged in a chevron pattern. For example, the slots 604 comprise a series of rows repeating in the direction of the y-axis. Each row comprises a pattern including a plurality of chevrons repeating in the direction of the x-axis. FIG. 6e shows the slots 604 arranged according to an additional geometric pattern. According to the pattern of FIG. 6e, the slot patterns 602 form a series of repeating, interlocking geometric shapes similar to those commonly used for reinforced earth retaining walls. For example, the active material portions 602 in FIG. 6e comprise protrusions 650 that are received into recesses 652 formed by one or more adjacent active material portions 602. Although some of the patterns shown in FIGS. 6a-6e are described with respect to the x and y-axes, it will be appreciated that these patterns may be rotated to any suitable orientation. Also, in addition to or instead of the patterns shown, various arrays of stripes, squiggly lines, ribs, crosshatch, dots, dimples, zig-zags, spirals, circles, squares, rectangles, triangles, hexagons, and combinations thereof may also be used. For example, stripe patterns may be utilized to enable flexing in a single dimension. Various patterns may be created utilizing slot die patterning to create waves in the active material.

Figure 7:
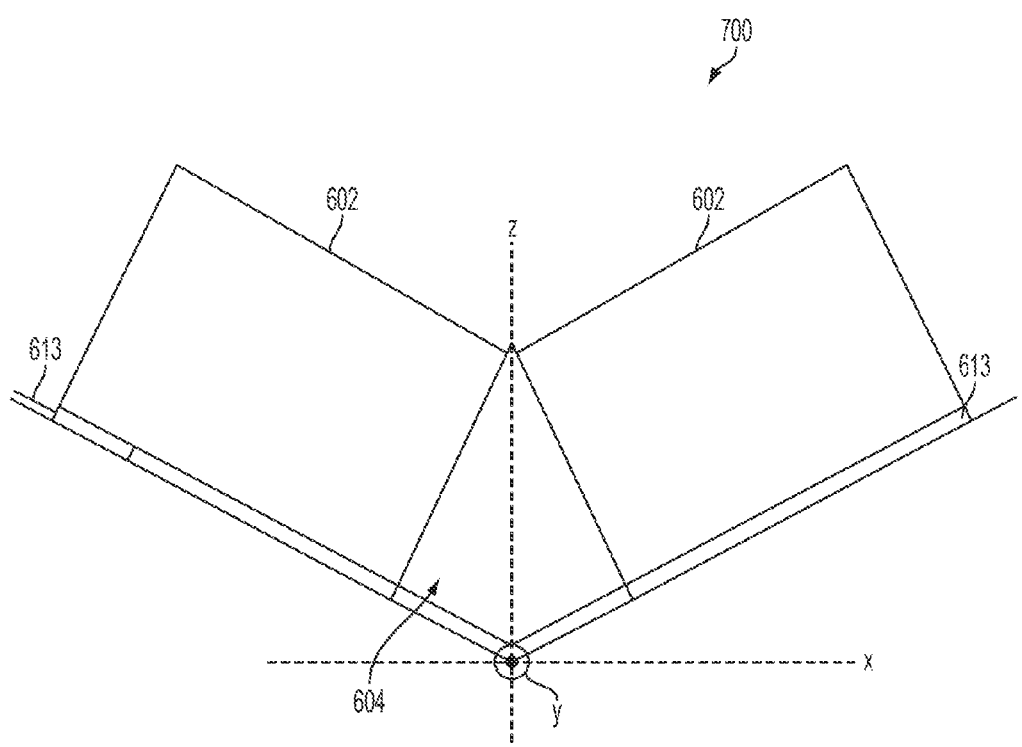
FIG. 7 shows a cross section on the x-axis of one embodiment of a slot and adjacent active material portions flexed along the y-axis.

Because the slots 604 are either empty or filled (completely or partially) with a compliant material, the active layers 601, etc. may have increased flexibility in or near the direction or directions of the slots 604. For example, FIG. 7 shows a cross section on the x-axis of one embodiment of a slot 604 and adjacent active material portions 602 flexed along the y-axis. As illustrated, the active layer flexes until the slot 604 is closed and the adjacent active material portions 602 contact (or nearly contact) one another before significant stresses from orthogonal flexure are felt by the active material portions 602. As illustrated, the slots 604 may form small hinge points that give the active material portions 602 enhanced flexibility along the slots 604. FIG. 7 also illustrates the optional adhesion layer 613, which may be positioned between the slots 604 and active material portions 602 and the adjacent layer (e.g., a current collector layer).

The degree of flexing supported by the active material portions 602 along a particular axis or direction may be proportional to width, spatial frequency, and orientation of the slots 604 relative to the flexing direction. For example, the degree of flexing supported along any particular flexing direction may depend on the degree to which the slots 604 run parallel to the flexing direction, as well as the width of the slots 604. For example, the rectangular patterned active layer 601 may support flexing along both the x and y axes. The diamond patterned active layer 603 may support flexing along both the x and y axes. The herringbone pattern of active layer 605 may support flexing along the y-axis and, to a lesser degree, along the x-axis. The chevron pattern of active layer 607 may support flexing along the x-axis and, to a lesser degree, along the y-axis. The active layer 609 may support flexing along both the x and y axes. It will be appreciated that the patterned active layers 601, 603, 605, 607, 609, as well as active layers having various other patterns may support flexing along other flexing directions in addition to those described herein.

Dimensions of the active material portions 602 and slots 604 may take any suitable value. Unless otherwise indicated, dimensions referred to herein are final dimensions measured after densification. For example, the various layers described herein may have wet coating thicknesses or other dimensions that may be measured as the various layers are first applied. Dry coating thickness and other dimensions may be measured after a drying process. Final or densified dimensions may be measured after a densification process.

Figure 8:
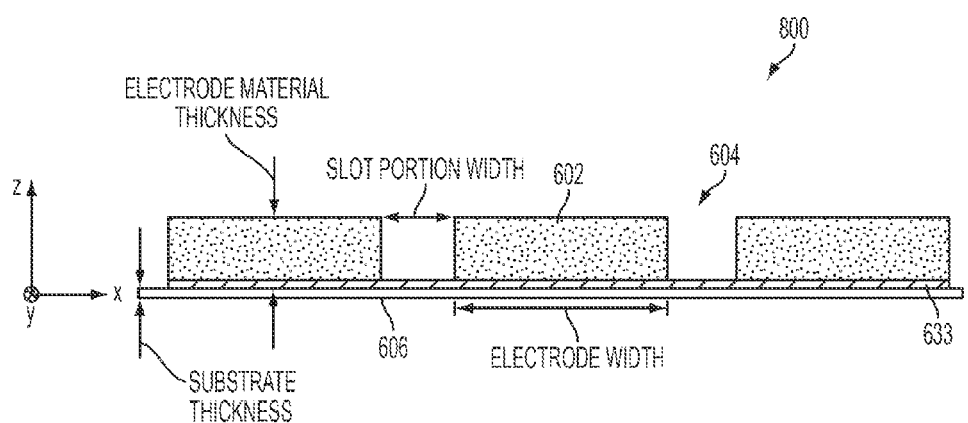
FIG. 8 shows a view of one embodiment of a patterned active layer illustrating dimensions of the active material portions and slots.

In some embodiments, the slots 604 in any given active layer may have a common width. Generally, wider slots 604 relative to the active material portions 602 portions lead to greater flexibility, but may also reduce the overall density of active material portions 602 and, therefore, the energy density available from a battery utilizing the active material portions 602. FIG. 8 shows a view of one embodiment of a patterned active layer 800 illustrating dimensions of the active material portions 602 and slots 604. In FIG. 8, the active material portions 602 are illustrated as densified coatings which were deposited on a substrate 606. Optionally, prior to deposition of the active material portions 602, an adhesion layer 633 may be deposited on the substrate 606. The substrate 606 may comprise a flat sheet of material positioned parallel to the flat sheet of active material portions 602. The substrate 606 may also function as a current collector in a completed battery structure. In various embodiments, the width of the slots 604 may be substantially uniform and substantially equal to the thickness of the active material portions 602 on the substrate 606. For example, the width of the slots 604 may be within plus or minus 10% of the thickness of the active material portions 602 or, in some embodiments, the width of the slots 604 may be within plus or minus 5% of the thickness of the active material portions 602. When the dimensions of the battery structure and active material portions 602 are smaller, it may more difficult to maintain tighter tolerances. For example, the width of the slots 604 may be within plus or minus 20% of the thickness of the active material portions 602.

In some embodiments, the width of the slots 604 may be less than about ten times the thickness of the active material portions 602. For example, if the thickness of the active material portions 602 is greater than 100 microns, then the width of the slots 604 may also be greater than 100 microns and, in some embodiments, may be less than about 1000 microns or about 1 millimeter (mm). Also, in some embodiments, the pattern width in the direction of curvature (e.g., the width of an active material portion 602 and adjacent slot 604 in the direction of curvature) may be on the order of the desired radius of curvature. For example, the pattern width may range from about ⅕ of the desired radius of curvature to about 5 times the desired radius of curvature. In an embodiment where the desired radius of curvature is 1 centimeter, then, the pattern width may be between ⅕ of a centimeter and five centimeters.

Figure 9:
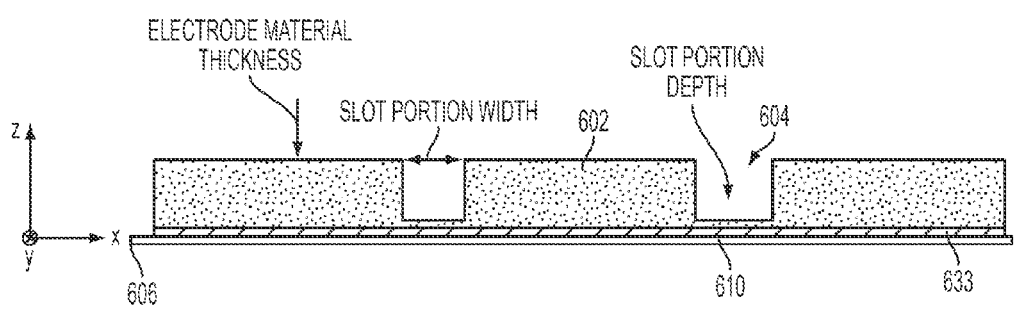
FIG. 9 shows a view of one embodiment of a patterned active layer with a layer of active material that has re-flowed into the slots, for example, during the coating process.

In some embodiments, as described herein above, some active material may reflow into the slots 604 during the coating and drying process and may be left behind after densification. For example, FIG. 9 shows a view of one embodiment of a patterned active layer with a layer 610 of active material that has re-flowed into the slots 604, for example during the wet coating process. As described herein, because the layer 610 of active material in the slots 604 is thinner, and therefore has a smaller cross-sectional area than the active material portions 602, it may be more flexible. In the illustrated example embodiment, the depth of the slot 604 is less than the thickness of the active material portion 602 by an amount equal to the thickness of the layer 610. In one example embodiment, the thickness of the slot may be about 75 microns; the thickness of the layer 610 may be about 20 or 25 microns. In some embodiments, the thickness of the layer 610 may not exceed about 20% of the thickness of the active material. It will be appreciated that the layer 610 may be utilized to allow clear patterning at small active layer thickness without the aid of expensive and complex methods such as photolithography. Alternatively, patterned active layers may be generated utilizing photolithography or other methods capable of forming thin active layers in the manner illustrated in FIG. 8.

FIGS. 8 and 9 also illustrate the optional adhesion layer 633. When included, the adhesion layer 633 may be placed uniformly on the substrate 606, with the active material portions 602 deposited on top. For example, the adhesion layer 633 may be included when the thickness of the active material portions 602 is less than a threshold thickness (e.g., less than 100 microns). The layer 633 may be uniformly deposited over all or a portion of the substrate 606. The thickness of the adhesion layer 633 may be selected based on the application. For example, in some embodiments, the adhesion layer 633 may be between about 100 nanometers and 8 microns.

It will be appreciated that including slots 604 in patterned active layers may reduce the energy density generated by the resulting battery structures. In some embodiments, this loss is at least partially recouped, at least partially, by utilizing advanced active materials, electrode materials, etc. For example, in some embodiments, advanced active materials and electrode materials may be used to increase the energy density by a factor of three so as to maintain equivalent performance between battery structures.

Patterned active layers, as illustrated in FIGS. 6a through 6e, may be generated according to any suitable manufacturing process. For example, in some embodiments, patterned active layers may be deposited onto a sheet of material that may subsequently form another layer of a battery structure such as a current collector or other transfer layer. The combined layers may be joined with the remaining battery layers to form a battery cell or other battery structure. For example, FIG. 11a shows a cross sectional view of one embodiment of a battery structure 1100 having patterned active layers 1102, 1104. A cathode layer 1102 comprises active material portions 602 and slots 604 there between, as described above. The active material portions 602 of the cathode layer 1102 may be manufactured by depositing on a cathode current collector layer 1110, for example, as described with respect to FIGS. 8 and 9. Optionally, an adhesion layer 1108 is positioned between the cathode current collector layer 1110 and the cathode layer 1102. When the adhesion layer 1108 is present, the cathode layer 1102 may be deposited on the adhesion layer 1108. The anode layer 1104 may similarly comprise active material portions 602 and slots 604, and may similarly be deposited on an anode current collector layer 1112 with an optional anode adhesion layer 1114 there between.

The various layers shown in FIG. 11a may be combined to form the battery structure 1100. For example, the cathode current collector layer 1110 and cathode layer 1102 may be placed in contact with an electrolyte layer 1106. The anode layer 1104 and anode current collector layer 1112 may be placed on contact with the opposite side of the electrolyte layer 1106, for example, as indicated by arrows 1120. In the illustrated example, the patterns of the respective active layers 1102, 1104 are aligned in the resulting battery structure 1100. For example, all or a portion of the active material portions 602 of the active layers 1102, 1104 may be aligned and/or all or a portion of the slots 604 of the active layers 1102, 1104 may be aligned. In some example embodiments, the electrolyte/separator layer 1106 may be arranged according to a pattern matching that of the active layers 1102, 1104. For example, optional slits 1120 in the electrolyte/separator layer 1106 may align with slots 604. The slits 1120 may be formed in any suitable manner. For example, continuous punch-out or batch edge punch-out patterning methods may be applied to a solid electrolyte material or a matrix material that is subsequently infiltrated with electrolyte material. In some embodiments, slitting may be used to determine electrolyte/separator layer 1106 dimensions.

In various embodiments, the battery structure 1100 may comprise additional active layers 1102', 1104'. For example, an additional cathode layer 1102' and optional adhesion layer 1108' may be formed on the cathode current collector layer 1110 opposite the cathode layer 1102. The additional cathode layer 1102' may also be patterned and may have a pattern that aligns with that of the cathode layer 1102 (and with the anode layer 1104). An additional anode layer 1104' may similarly be formed, along with an optional adhesion layer 1114', on the anode current collector material 1112 opposite the anode layer 1104. The additional anode layer 1104' may also be arranged according to patterns that may also align with that of the other layers 1102, 1102', 1104. In this way, additional active layers and active layers (not shown) may be added to the battery structure, for example, to form a layered structure similar to that shown in FIG. 3.

Figure 11B:
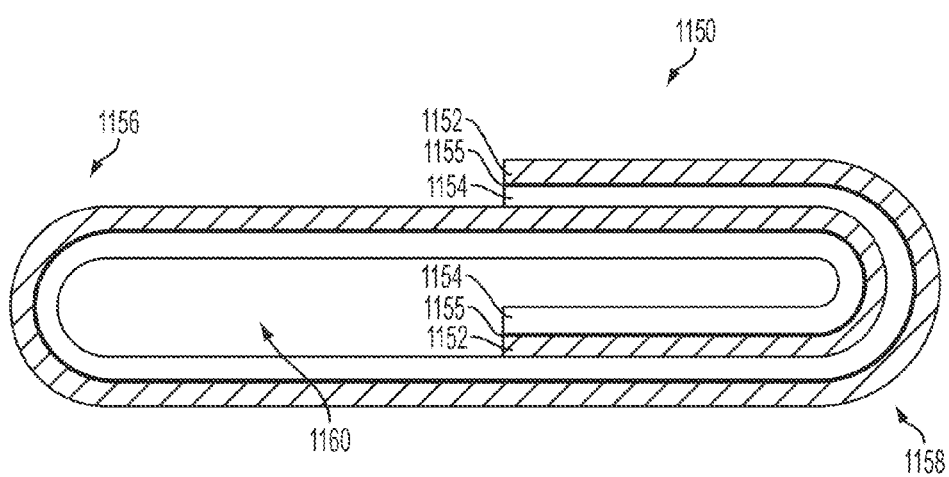
FIG. 11b is a diagram of one embodiment of a battery structure according to a wound configuration.

The battery structure 1100 may be formed into a battery in any suitable configuration. For example, according to a stacked configuration, additional layers 1102, 1110, 1106, 1104, 1112, etc. are formed and stacked above and/or below the structure 1100 to form additional cells. Like active layers are electrically connected to one another in parallel. Unlike active layers remain electrically insulated. According to a wound configuration, layers are wrapped back upon one another in a serpentine manner (e.g., like a jelly roll pastry). For example, FIG. 11b is a diagram of one embodiment of a battery structure 1150 according to a wound configuration. The structure 1150 comprises a cathode layer 1152, an anode layer 1154 and an electrolyte/separator layer 1155. The various layers are wrapped at folds 1156, 1158. In various embodiments, an interior portion 1160 of the structure 1100 may comprise a sold piece around which the various layers 1152, 1154, 1155 are wrapped or wound. Current collector layers may be positioned adjacent each of the active layers 1152, 1154. Also, for example, although one example of each layer 1152, 1154, 1155 are shown in FIG. 11b, it will be appreciated that additional layers may be added, for example, in the manner illustrated by FIG. 11a.

Figure 10:
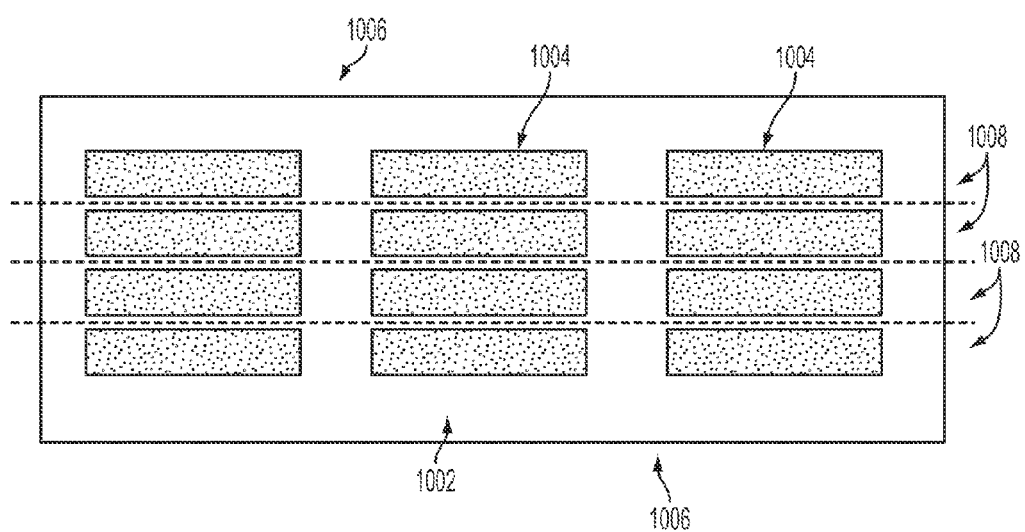
FIG. 10 shows one embodiment of a sheet of current collecting material at an intermediate stage of manufacture.

FIG. 10 shows one embodiment of a sheet 1002 of current collecting material 1002 at an intermediate stage of manufacture. For example, active regions 1004 may be deposited on the sheet 1002 according to any suitable deposition method. In some embodiments, an adhesion layer (not shown in FIG. 10) may be deposited before the active regions 1004. The active regions 1004, in some embodiments, are patterned, as shown in FIGS. 6a-6e. All or a portion of the active regions 1004 may make up all or part of an active layer, as described herein (e.g., an anode layer or a cathode layer). In some embodiments, the sheet 1002 may be cut as indicated, forming rows 1008. For example, the rows 1008 may be used to form hinges at fold points 1006, for example, as described herein below.

Figure 12:
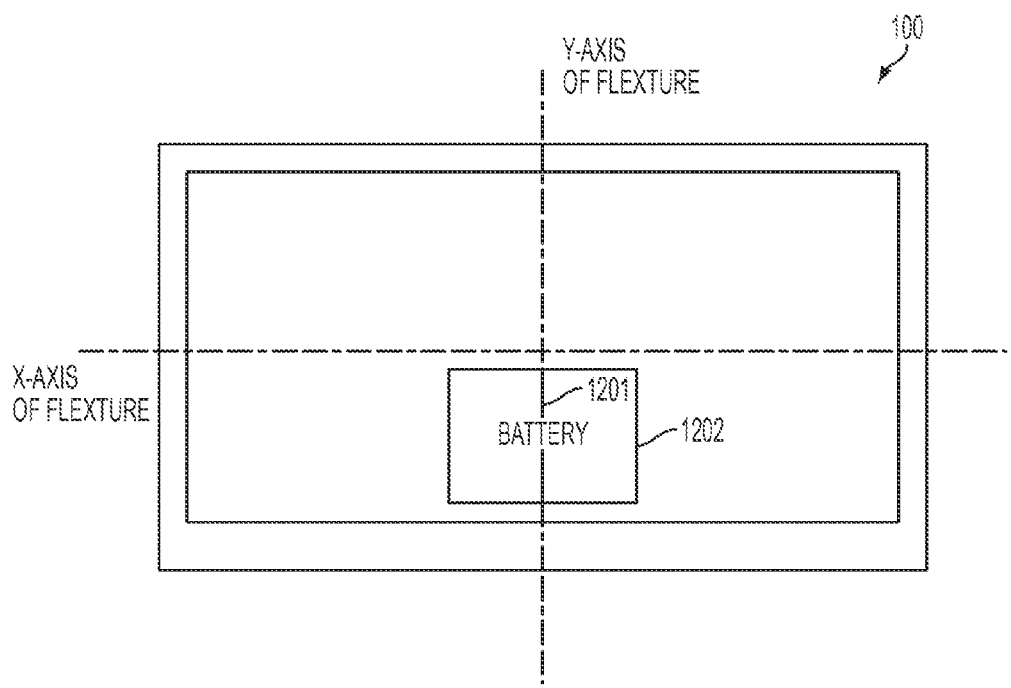
FIG. 12 shows one embodiment of the flexible computing device of FIG. 1 comprising a flexible battery.

Batteries and battery structures utilizing patterned active layers may be utilized in flexible devices, such as the flexible computing device 100. In some embodiments, a flexible battery may be oriented in a flexible device based on the configuration of the battery and the desired flexing directions of the device. For example, FIG. 12 shows one embodiment of the flexible computing device 100 comprising a flexible battery 1202. The computing device 100 is configured to be primarily flexible in directions parallel to the x-axis and in directions parallel to the y-axis. The battery 1202 is configured to be flexible at least in directions parallel to its flexure line 1201. For example, the battery 1202 may utilize patterned active layers or other patterned battery structure oriented in a manner that allows flexibility parallel to the direction 1201. The battery 1202 is positioned within the device 100 with its flexure line aligned with the y-axis. In this way, when the device 100 is flexed parallel to the y-axis, the battery 1202 may similarly flex parallel to its flexure line 1201 without causing excessive stress. The battery 1202 is also positioned offset from the x-axis. As illustrated above with respect to FIGS. 4 and 5, battery portions away from the flexure line 1201 are subject to lower flexing stresses (e.g., orthogonal flexure). Therefore, the battery 1202 will experience less flexing stress when the device 100 is flexed about the x-axis. In some embodiments, then, the battery 1202 may utilize an active layer pattern that is primarily flexible about the flexure line 1201, but not as flexible about the orthogonal direction.

Figure 13:
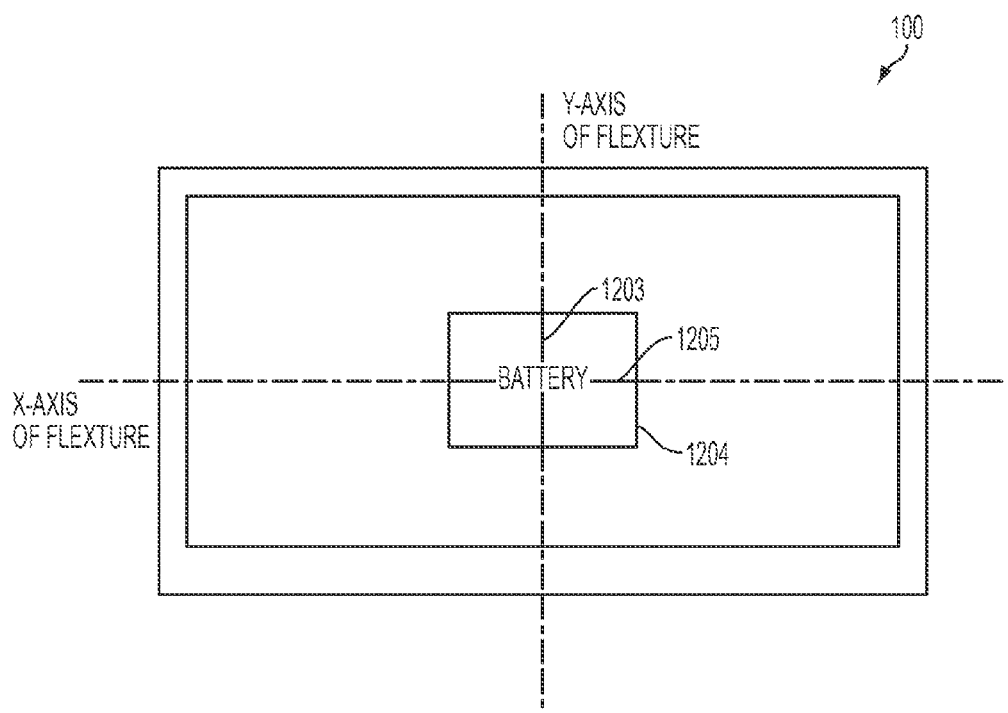
FIG. 13 shows another embodiment of the flexible computing device of FIG. 1 comprising a flexible battery.

FIG. 13 shows another embodiment of the flexible computing device 100 comprising a flexible battery 1204. The flexible battery 1204 may be configured to flex along two flexure lines 1203, 1205. For example, the battery 1204 may utilize active layers and/or other components patterned similar to the active layers 601 and 603, which are flexible along two orthogonal directions. Although FIGS. 12 and 13 illustrate flexible batteries 1202, 1204 used in conjunction with flexible computing devices 100, it will be appreciated that flexible batteries, as described herein, may be used to power any suitable type of device.

Battery structures according to various embodiments may utilize a compliant electrolyte. For example, a compliant electrolyte may be a solid, a liquid, a gel, etc. with varying filler components or other compliant electrolyte. Such an electrolyte may be utilized in any suitable battery structure and, in some embodiments, may be used in conjunction with any of the other flexible battery structures described herein. In some embodiments, a compliant electrolyte may comprise thixotropic properties. For example, under shear stress, the electrolyte may enter a low viscosity fluid regime with a propensity to flow (shear-thinning). In this way, the interface between the electrolyte and the active layers may be maintained when the battery is flexed. For example, as the battery is bent, the electrolyte may shear and be allowed to flow. This may keep the electrolyte interface in electrical contact with the anode and cathode active materials under flexural shear, while minimizing the shear stress on the active layers. The electrolyte may be contained with the confines of the battery package or within isolation barriers within the battery. Examples of gel or otherwise compliant electrolytes may include salts such as $LiBF_4$, $LiPF_6$, $LiClO_4$, $LiCF_3SO_3$, $LiNi(SO_2CF_3)_2$, $LiN(SO_2CF_2CF3)_2$ and combinations thereof; solvents such as propylmethyl carbonate, ethylene carbonate, propylene carbonate, dimethyl carbonate, diethyl carbonate, butylene carbonate, ethylmethyl carbonate, dimethoxyethane, poly (ethylene glycol) dimethylether (various molecular weights) and mixtures thereof; polymer backbones such as polyethylene oxide, polyimided based-materials, poly(acrylic acid), polyethylene oxide, poly(vinyl alcohol), poly (vinylidene fluoride), carboxymethyl cellulose, polyvinyl pyrrolidone, polytetrafluoroethylene, polyacrylonitrile, poly (methylmethacrylate) or other linear and non-linear polymeric materials and combinations thereof; etc. In some embodiments utilizing a liquid, gel or otherwise compliant electrolyte, the electrolyte/separator layer may further comprise a filler for mechanical, thermal and/or ionic conduction stability. One example of such a filler is a fumed silica filler (i.e. R805).

Figure 14:
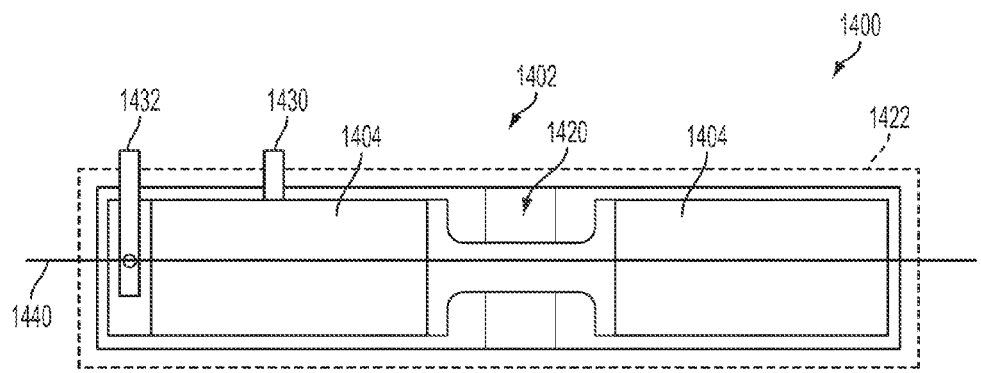
FIG. 14 shows a diagram of one embodiment of a battery structure comprising a hinge region.

Batteries and battery structures according to various embodiments may comprise hinge points that facilitate flexing. FIG. 14 shows a diagram of one embodiment of a battery structure 1400 comprising a hinge region 1402. The battery structure 1400 comprises cell regions 1404 and the hinge region 1402. Cell regions 1404 may comprise layers (not shown) in a manner similar to that described herein above with respect to the battery structure 300 of FIG. 3. For example, cell regions 1404 may comprise various anode, cathode, electrolyte, and current collector layers. Layers within the cell regions 1404 may be oriented according to any suitable configuration. For example, layers within the cell regions 1404 may be stacked and/or wound (e.g., as illustrated in FIG. 11).

The hinge region 1402 may be formed by discontinuities in a least a portion of the layers of the battery structure 1400. For example, more compliant layers of the battery structure 1400 may be continuous across the cell regions 1404 and the hinge region 1402. Examples of layers that may be continuous include current collector layers, electrolyte/separator layers, packaging layers, adhesion layers etc. Other, less compliant layers of the battery structure 1400 (e.g., the cathode and anode layers) may have discontinuities at the hinge region 1402. For example, anode or cathode layers may not be deposited on portions of the current collector layers that are to make up the hinge regions 1402. This may be implemented in a manner similar to that described herein above with respect to FIG. 10, where fold points 1006 were left without active material deposits. The omission of layers at the hinge region 1402 may give the structure 1400 a smaller cross-sectional area at the hinge region 1402 than at the cell regions 1404. Further, the layers included in the hinge region 1402 may be more compliant layers of the battery structure 1400 including, for example, current collector layers, electrolyte/separator layers, etc. This may reduce flexing stresses at the hinge region 1402, allowing the structure 1400 to more readily bend at the hinge region 1402. The hinge region 1402 may be of any suitable size or length. In some embodiments, the length of the hinge region is no more than about one third of the total structure 1400 length and/or about 20 to 80 percent of the width of the cell regions 1404.

Figure 15:
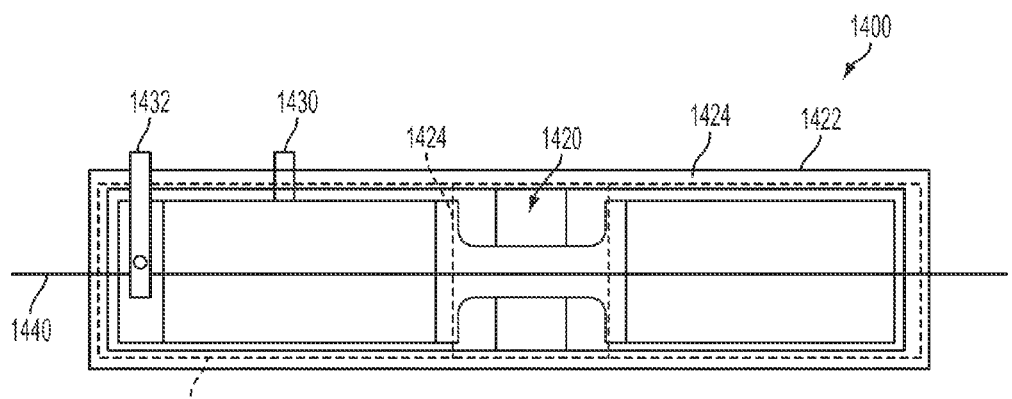
FIG. 15 shows a diagram of one embodiment of the battery structure of FIG. 14 showing sealing lines where the various layers may be sealed to the packaging layer, which may surround the structure.
Figure 16:
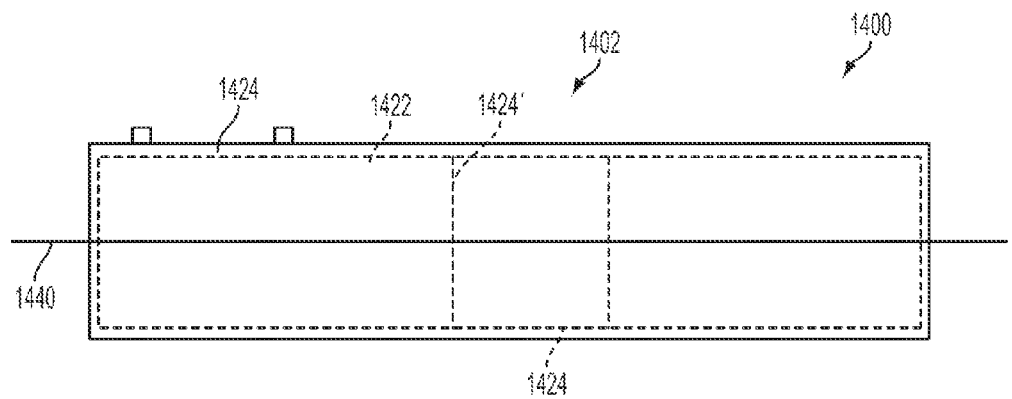
FIG. 16 shows a diagram of one embodiment of the battery structure of FIG. 14 showing the packaging layer completely surrounding the battery structure.

FIG. 14 also illustrates electrodes 1432, 1430. Each respective electrode 1432, 1430 may be electrically coupled to one of the types of active layers in the cell regions 1404. For example, electrode 1432 may be electrically coupled to connect the anode layers of the cell regions 1404 in parallel. Electrode 1430 may be electrically coupled to connect the cathode layers of the cell regions 1404 in parallel. Dotted line 1422 in FIG. 14 illustrates a packaging layer. The packaging layer 1422 is shown in greater detail in FIGS. 15-17. For example, FIG. 15 shows a diagram of one embodiment of the battery structure 1400 showing sealing lines 1424 where the various layers may be sealed to the packaging layer 1422, which may surround the structure 1400. The packaging layer 1422 may be sealed to the various other layers in any suitable manner including, for example, using a suitable adhesive. FIG. 16 shows a diagram of one embodiment of the battery structure 1400 showing the packaging layer 1422 completely surrounding the battery structure 1400. As illustrated, the sealing lines 1424 include optional sealing lines 1424' that set out interlayers to seal between the hinge region 1402 and the cell portions 1404. In various embodiments, the seals 1424 may be performed within the structure 1400 with multiple interlayer seals to fully enclose the electrolyte within the respective cell portions 1404 and prevent leakage of electrolyte (e.g., liquid or gel electrolyte) into the hinge region 1402.

Figure 17:
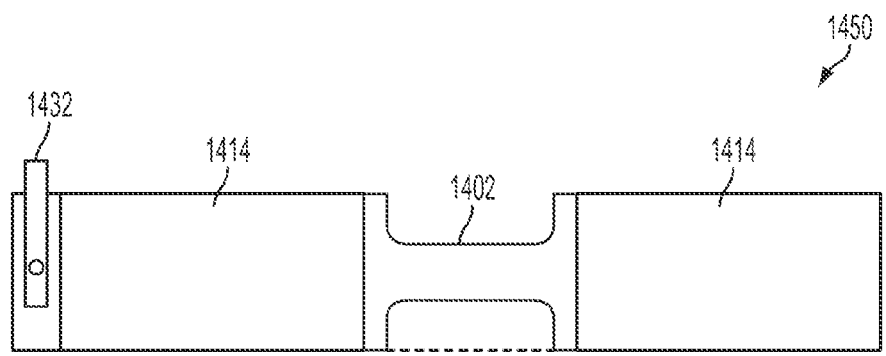
FIG. 17 shows one embodiment of an electrode structure that may be a component of the battery structure of FIG. 14.
Figure 18:
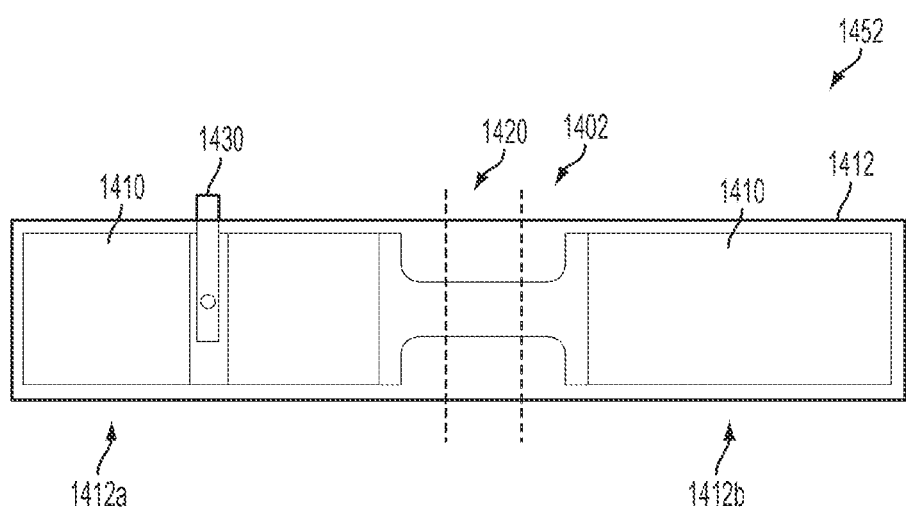
FIG. 18 shows one embodiment of an electrode structure that may also be a component of the battery structure of FIG. 14.

FIG. 17 shows one embodiment of an electrode structure 1450 that may be a component of the battery structure 1400. For example, the electrode structure 1450 may be associated with the anode electrode 1432. At the cell regions 1404, the electrode structure 1450 may connect the anode electrode 1432 to a parallel connection of the various anode layers of the cell region 1404. At the location of the cell regions 1404 in FIGS. 14-16, FIG. 17 illustrates a single anode layer 1414. FIG. 18 shows one embodiment of an electrode structure 1452 that may also be a component of the battery structure 1400. For example, the electrode structure 1452 may be associated with the cathode electrode 1430. At the cell regions 1404, the electrode structure 1452 may connect the cathode electrode 1430 to a parallel connection of the various cathode layers of the cell region 1404. At the location of the cell regions 1404 in FIGS. 14-16, FIG. 18 shows a single cathode layer 1410. FIG. 18 also indicates an electrolyte/separator layer 1412 positioned over the cathode layer 1410. The electrolyte/separator layer 1412, in some embodiments, is continuous across the hinge region 1402. In some embodiments, the electrolyte/separator layer 1412 may comprise two discontinuous and overlapping sub-layers 1412*a*, 1412*b*, described in more detail with respect to FIG. 19.

Figure 19:
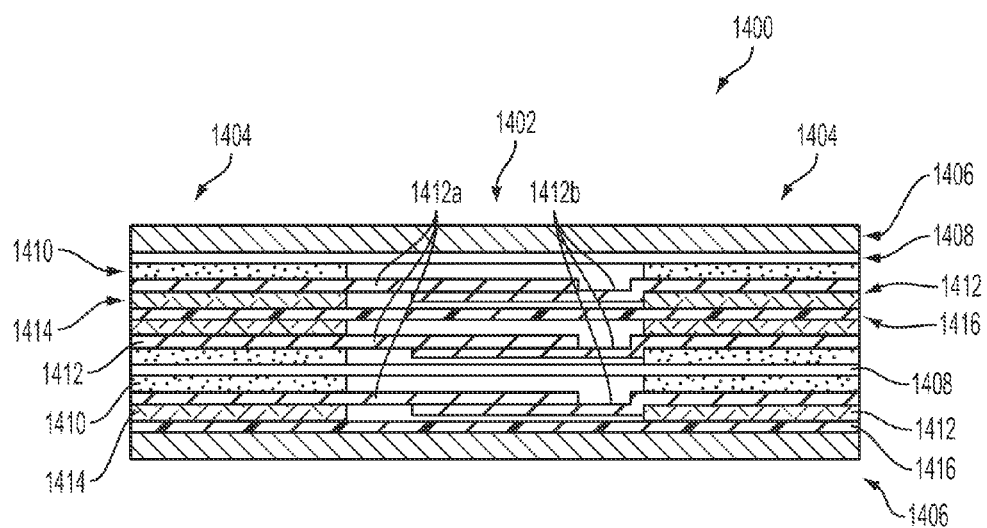
FIG. 19 shows a diagram of one embodiment of the battery structure of FIG. 14 illustrating the various layers.

FIG. 19 shows a diagram of one embodiment of the battery structure 1400 illustrating the various layers. The layers 1406, 1408, 1410, 1412, 1414, 1416 may be similar to the layers of the structure 300 described herein above with respect to FIG. 3. For example, a packaging layer 1406 is at the extremity of the structure 1400 and may enclose the structure 1400. In some embodiments, the packaging layer may be about 150 microns in thickness. A cathode current collector layer 1408, in some embodiments, may comprise aluminum. A cathode layer 1410, in some embodiments, may comprise a lithium-containing compound. An electrolyte/separator layer 1412 may comprise a solid, liquid or gel electrolyte, as described herein. An anode layer 1414, in some embodiments, may comprise carbon. An anode current collector layer 1416, in some embodiments, may be made of copper. In some embodiments, the thicknesses of the various layers 1408, 1410, 1412, 1414, 1416, etc. may be as described herein above with respect to FIG. 3. The layers 1408, 1410, 1412, 1414, 1416 may occur more than once in the structure 1400 between the packaging layers 1406 (three unit cells in the illustrated example embodiment). For example, the layers 1408, 1410, 1412, 1414, 1416 may be formed in a stacked and/or wound configuration. It will be appreciated that optional adhesion layers may be included between the respective current collector layers 1408, 1416 and active layers 1410, 1414.

As illustrated in FIG. 19, the active layers 1410 and 1414 do not extend into the hinge region 1402. In the illustrated example, current collector layers 1408, 1416 as well as electrolyte/separator layer 1412 do extend into the hinge region 1402. It will be appreciated that some or all of the layers shown in the hinge region 1402 may be omitted. For example, in some embodiments, only the current collector layers 1408, 1410 may extend into the hinge region 1402. Also, in some embodiments, additional layers may extend into the hinge region 1402. For example, in some embodiments, the active material for the cathode (e.g., cathode material) may be or include a polymer-based material such as those utilized with organic electronics. When the cathode material comprises this or similarly flexible materials, the cathode layer 1410 may extend through the hinge region 1402.

In the example embodiment of FIG. 19, the electrolyte/separator layer 1412 is overlapped in the hinge region 1402 to add additional flexibility. For example, each electrolyte/separator layer 1412 may comprise two distinct and discontinuous sub-layers, one (1412*a*) on the cell region 1404 on a first side of the hinge region 1402 and another (1412*b*) on the cell region 1404 on the other side of the hinge region 1402. The two portions 1412*a*, 1412*b* are also illustrated in FIG. 18, described above. The two electrolyte/separator sub-layers 1412 need not be physically continuous, but may be configured to overlap one another in the hinge region 1402 as shown. An overlap region 1420 is illustrated in FIGS. 14-15 and 18. In some embodiments, the portions of the sub-layers 1412*a*, 1412*b* present in the hinge region 1402 may comprise a matrix material that does not include electrolyte material, or has a concentration of electrolyte material lower than that within the cell regions 1404. For example, electrolyte material (e.g., infused in a gel or liquid) may not be present in the hinge region 1402, or may be present at a concentration lower than that within the electrolyte/separator layer 1412 in the cell regions 1404. This may be accomplished in any suitable manner. For example, the electrolyte material may be deliberately omitted from the portions of the matrix material that are within the hinge region 1402. Also, in some embodiments, electrolyte material may diffuse from the portion of the matrix material that is within the hinge region. In some embodiments, the overlapping sub-layers 1412*a*, 1412*b* may slide relative to one another when the structure 1400 is flexed at the hinge region 1402. This may cause friction between the respective portions 1412*a*, 1412*b*, however, because these areas are not active and need not be in electrical contact with each other, friction and even damage to the overlapping sub-layers 1412*a*, 1412*b* may be acceptable.

Figure 20:
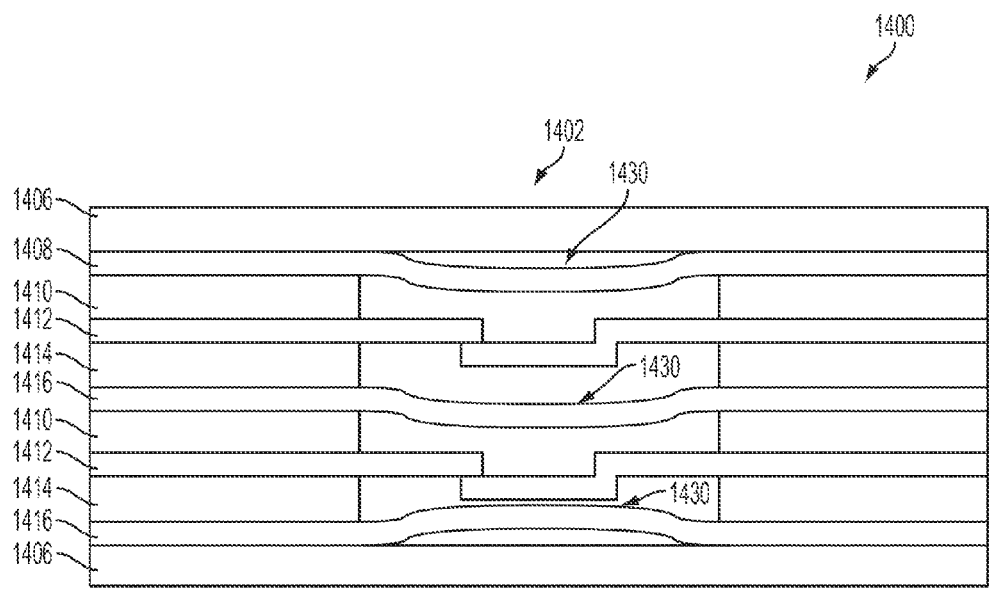
FIG. 20 shows a diagram of one embodiment of the battery structure of FIG. 14 where current collector layers have a length within the hinge region exceeding the length of the hinge region.
Figure 21:
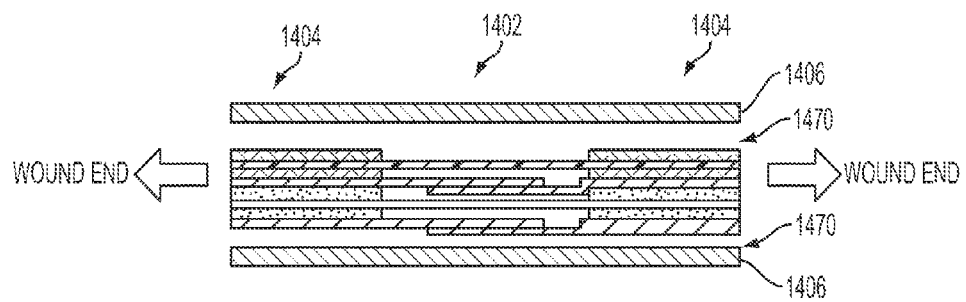
FIG. 21 shows a diagram of one embodiment of the battery structure of FIG. 14 with spaces positioned between the packaging layers and the remainder of the layers of the battery structure.

In some embodiments, some or all of the layers of the structure 1400 that extend through the hinge region 1402 may be lengthened to further enhance flexibility. For example, the length of the layer within the hinge region 1402 may exceed the length of the hinge region 1402. FIG. 20 shows a diagram of one embodiment of the battery structure 1400 where current collector layers 1408, 1416 have a length within the hinge region 1402 exceeding the length of the hinge region 1402. This may cause the current collector layers 1408, 1416 to bunch or curve within the hinge region 1402, illustrated by curved region 1430. Any suitable shape or amount of curvature or bunching may be utilized. Also, although the electrolyte/separator layers 1412 are illustrated in an overlapped configuration in FIG. 20, it will be appreciated that these layers 1412 may be curved and/or straight within the hinge region 1402. Curved regions 1430 within the hinge region may increase the flexibility of the hinge region 1402, thereby increasing the flexibility of the battery structure 1400 as a whole. In some embodiments, curved regions 1430 may also facilitate stretching of the battery structure 1400, which may increase perceived flexibility. FIG. 21 shows a diagram of one embodiment of the battery structure 1400 of FIG. 14 with spaces 1470 positioned between the packaging layers 1406 and the remainder of the layers of the battery structure 1400. This may leave sufficient room for flexing the remainder of the layers back upon themselves in a wound configuration while remaining within the packaging layers 1406. For example, the wound ends referred to in FIG. 21 may be similar to the folds 1156, 1158 illustrated in FIG. 11*b*.

Figure 22:
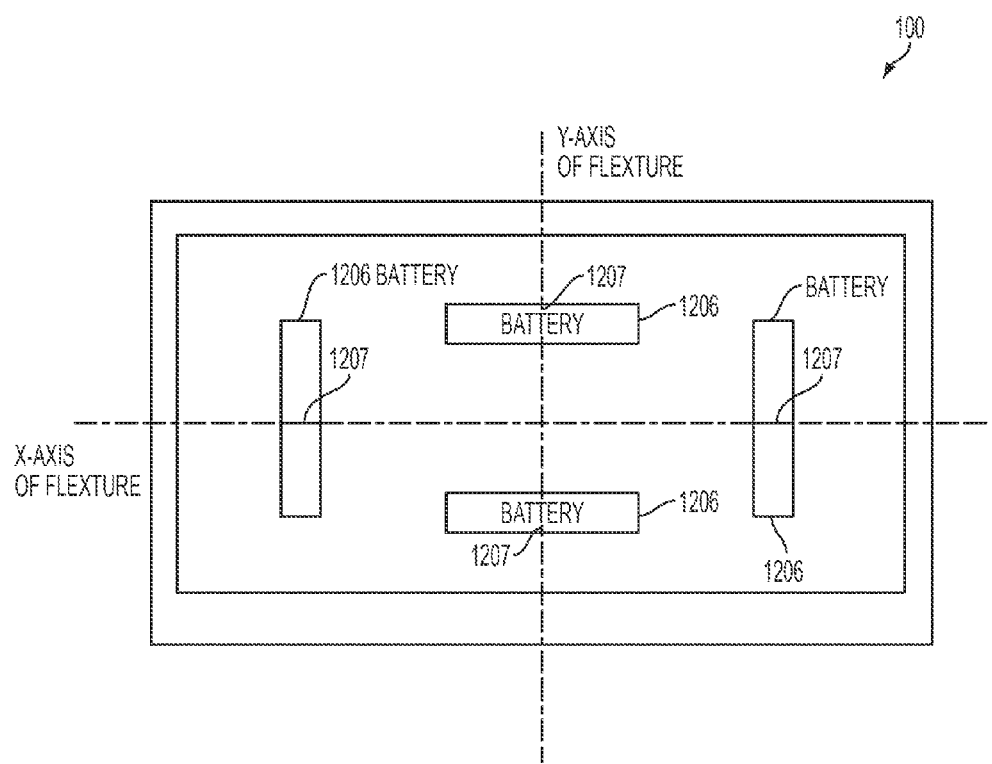
FIG. 22 shows one embodiment of the flexible computing device of FIG. 1 comprising flexible batteries having hinges.

FIG. 22 shows one embodiment of the flexible computing device 100 of FIG. 1 comprising flexible batteries 1206 having hinges 1207. The hinges may be aligned with desired flexing directions, indicated in FIG. 21 by the x and y axes. It will be appreciated that hinged batteries 1206 may also be utilized in the manner described above with respect to FIG. 12. For example, a battery or batteries 1206 may be included in the embodiments shown in FIG. 12 with the hinge 1207 oriented in a manner similar to the way that the flexure line 1201 is oriented in FIG. 12. Also, for example, batteries 1202, 1204 comprising patterned active layers may be placed within the device in a manner similar to that illustrated by FIG. 22 with flexure lines 1201, 1203, 1205 oriented in a manner similar to the hinges 1207 of FIG. 22.

Figure 23A:
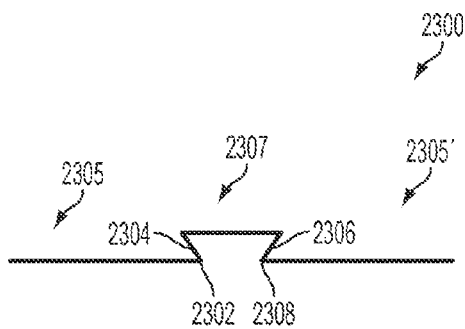
FIGS. 23a-23d show diagrams illustrating embodiments of folded hinges.
Figure 23B:
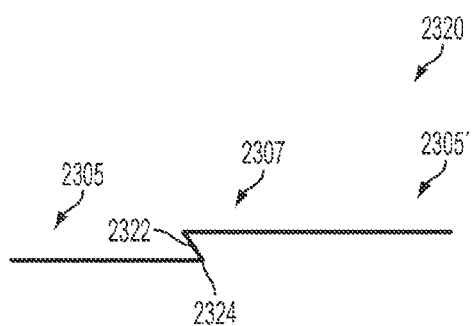
Figure 23C:
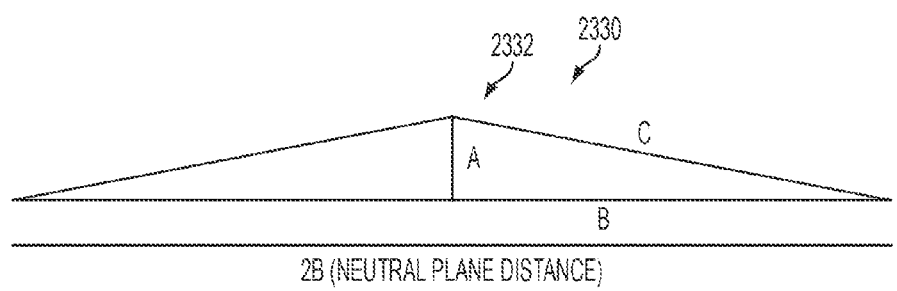
Figure 23D:
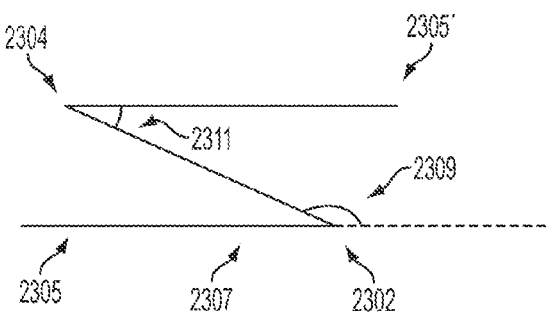

In some embodiments, battery structures, such as the battery structure 1400, may have hinge regions 1402 that are folded to enhance flexibility and/or battery geometry. For example, referring to FIG. 14, the distance between the cell regions 1404 may be large enough to allow folds of the hinge region. In various embodiments, the battery structure 1400 may be folded at the hinge regions 1402 while the cell regions 1404 may remain parallel to one another when the battery structure 1400 is at rest or un-flexed. For example, FIGS. 23*a*-23*c* show diagrams illustrating embodiments of folded hinges. FIG. 23*a* shows a mirrored "Z" hinge region 2300 comprising four folds, 2302, 2304, 2306, 2308 at a hinge region 2307 positioned between a pair of cell regions 2305, 2305'. A first "Z" hinge comprises folds 2302, 2304. At fold 2302, the cell region 2305' may be folded back on the cell region 2305. For example, the cell region 2305' may be folded between about 90° and 180° towards the cell region 2305. At a second fold, 2304, the cell region 2305' is folded again away from the cell region 2305. For example, the cell region 2305' may be folded between about 90° and 180° towards its original position. FIG. 23*d* shows a close-up of the folds 2302, 2304 illustrating the respective angles 2309, 2311 of the folds. In some embodiments, the sum of the angles 2309, 2311 is about 180° such that the cell regions 2305, 2305' are oriented similarly relative to one another both before and after the folds 2302, 2304 are made. For example, as shown in FIG. 23, the cell regions 2305, 2305' are parallel to one another both before and after the various folds are made. In some embodiments, additional folds (not shown) may be utilized with the sum of the angles of all of the folds being about 180°.

Referring again to FIG. 23*a*, a second similar set of folds 2308, 2306 may form a second "Z" hinge. For example, a sum of the angles of the folds 2306, 2308 may also be about 180°. These folds 2302, 2304, 2306, 2308 may partially or completely un-fold as the battery structure is flexed on the hinge region 2300, providing additional flexibility. FIG. 23*b* shows a "Z" hinge region 2320 with a single "Z" hinge comprising folds 2322, and 2324. Although the folds in FIGS. 23*a*, and 23*b* are described with respect to the cell region 2305' folding relative to the cell region 2305, it will be appreciated that equivalent folds may be generated by moving either cell region 2305, 2305' relative to the other. FIG. 23*c* shows a triangle hinge region 2330. In the hinge region 2330, a raised or tent portion indicates curved or bunched material, for example, as described herein with respect to FIG. 20. The amount of curvature or bunching is indicated by A, which is the height of the material at the hinge if laid on a flat surface, B, which represents half of the distance of the hinge region, and C, which is the hypotenuse formed by A and B and represents the surface of the hinge region 2330. For example, if the hinge region 2330 is pulled flat, it will gain distance equal to the difference between C and B. The distance gained from the hinge at a given height (e.g., 1 mm) height could be on the order of several 100 microns vs. a range of 20 to 2 mm neutral plane distances within a battery construct (FIG. 15). During flexing, the structure may lengthen without inducing orthogonal flexure or shear stress. Although the folds in FIGS. 23a, 23b and 23c are described with respect to complete cell and hinge regions, it will be appreciated that similar folds may be made at any stage of the manufacturing process. For example, various electrode structures (e.g., cathode or anode layers deposited on current collectors) may be folded as described.

Figure 24A:
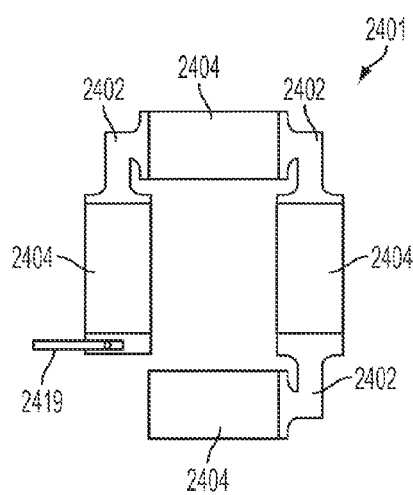
FIGS. 24a-24e shows one embodiment of a battery structure comprising multi-angle folded hinges.

Folded hinge regions may also be utilized to generate battery structures with multiple hinges oriented at various different angles parallel to the plane of the respective battery structures. FIGS. 24a-24e shows one embodiment of a battery structure 2400 comprising multi-angle folded hinges. FIG. 24a shows a structure 2401 anode portions 2404 connected by folded hinges 2402. The folded hinges 2402 may be constructed, for example, from metal current collector material (e.g., copper). An anode electrode tab 2419 may be welded to the structure 2401 and may be in electrical communication with the various anode portions 2404. For example, the anode electrode tab 2419 may be coupled to conductive current collector material that is continuous across the folded hinges 2402.

Figure 24B:
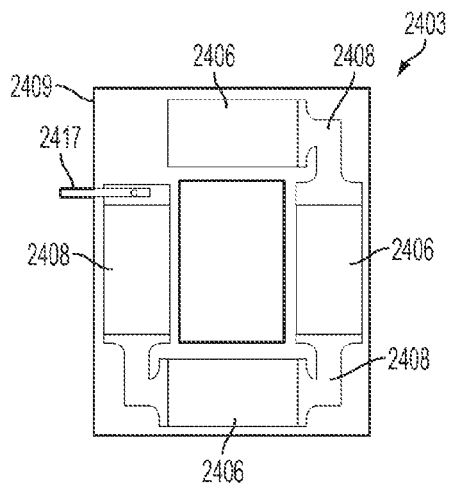
Figure 24C:
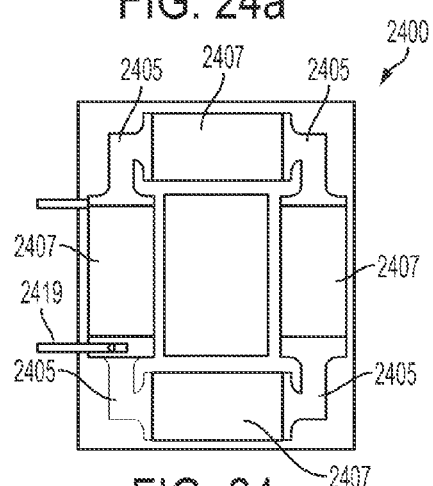
Figure 24D:
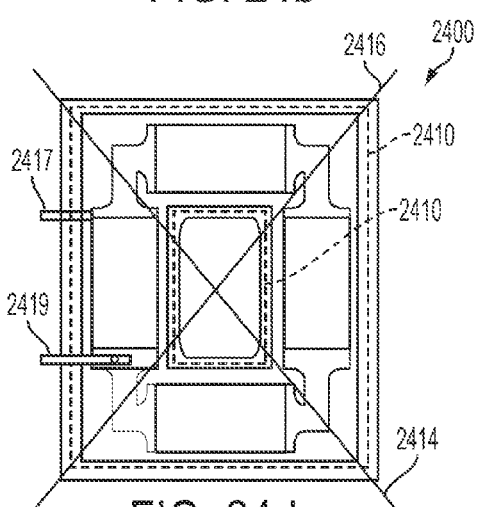
Figure 24E:
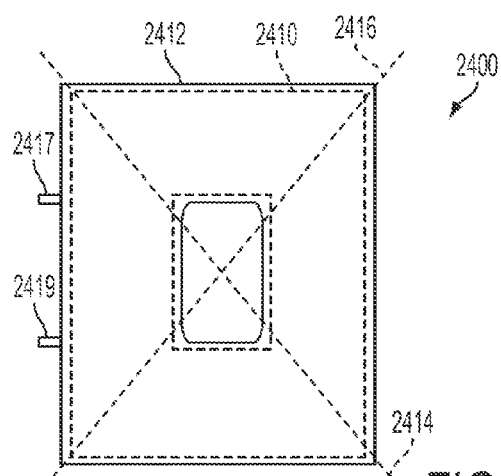
Figure 25:
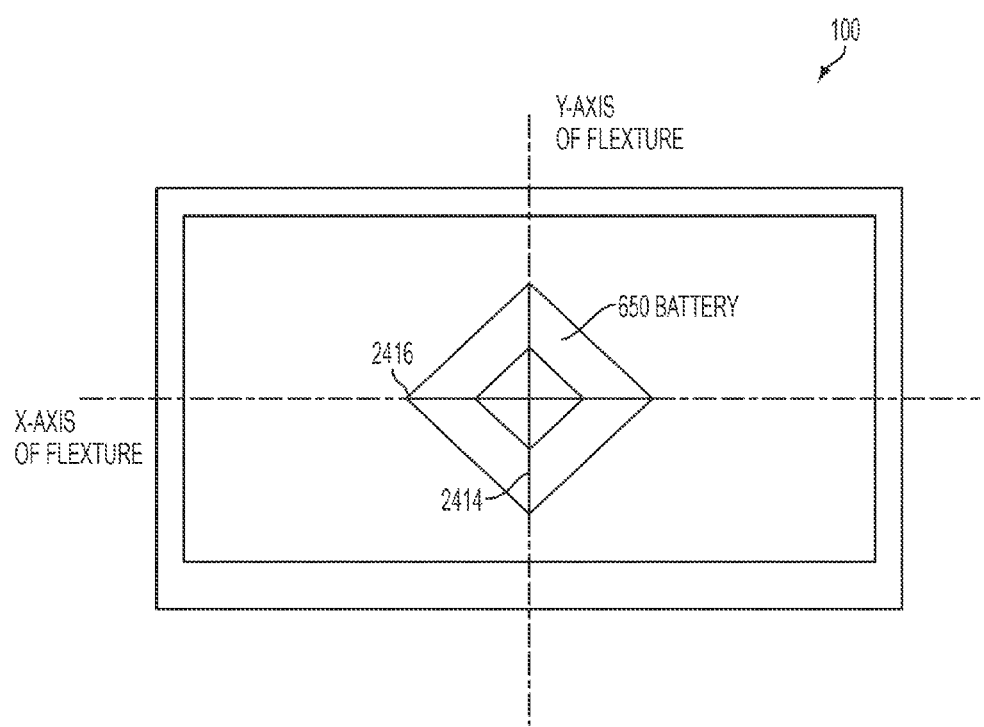
FIG. 25 shows one embodiment of the flexible computing device of FIG. 1 comprising a battery that comprises the cell of FIG. 24.

FIG. 24b shows a structure 2403 corresponding cathode 2406 and electrolyte/separator portions 2407 having folded hinges 2408. The folded hinges 2408, for example, may be made from metal current collector material (e.g., aluminum). Optionally, the folded hinges 2408 may also include electrolyte/separator material 2409. A cathode electrode tab 2417 may also be present (e.g., welded to the structure 2403) and may be electrically connected to the various cathode portions 2404, for example, in a manner similar to that described herein with respect to the anode electrode tab 2417. FIG. 24c shows a structure 2400 that is a combination of the structures 2401 and 2403, forming a complete battery structure 2400. Anode portions 2404 and cathode portions 2406 are combined to form cell portions 2407. In the structure 2400, hinge regions 2402 and 2408 may combine to form composite hinge regions 2405. Hinge regions 2405 may allow the cell 2404 to flex along diagonals 2414, 2416 shown in FIG. 24d. FIG. 24d also illustrates sealing lines 2410 where a packaging layer may be sealed to the cell 2400. FIG. 24e shows the structure 2400 within a packaging layer 2412. The structure 2400, in some embodiments, could be sealed along the diagonals 2416. Other sealing line patterns are envisioned. For example, each cell portion comprising an anode portion 2404, a cathode portion 2406, an electrolyte separator portion 2409 and various other layers (e.g., current collector layers) may be sealed. The packaging layer 2412 may completely enclose the remainder of the battery structure 2400, which may include the layers described as well as, for example, optional adhesion layers, interlayers, electrolyte sealant materials, etc. In the embodiment shown, the cell portions 2407 are offset from one another by 45° to form a square structure 2400. It will be appreciated, however, that any suitable number of cell portions 2407 and hinge portions 2405 of various angles may be utilized to form structures in any suitable shape. FIG. 25 shows one embodiment of the flexible computing device 100 of FIG. 1 comprising a battery 650 that comprises the cell 2400 of FIG. 24. The battery 650, as shown, is aligned with the diagonals 2414, 2416 aligned with the x and y axes to allow the device 100 to flex along these axes.

Figure 26A:
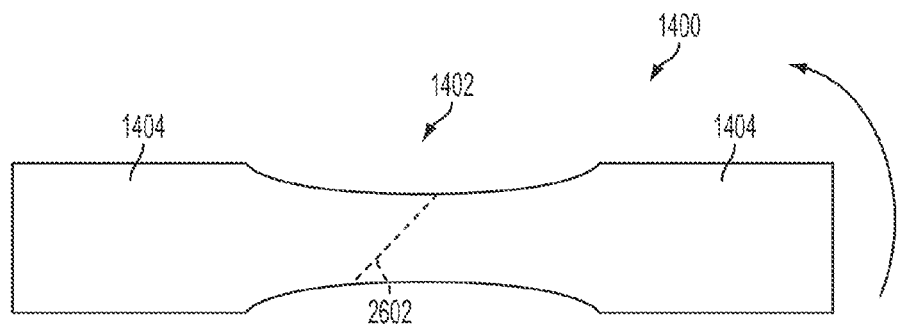
FIGS. 26a-26c show one embodiment of the battery structure illustrating an example method for generating a folded hinge.
Figure 26B:
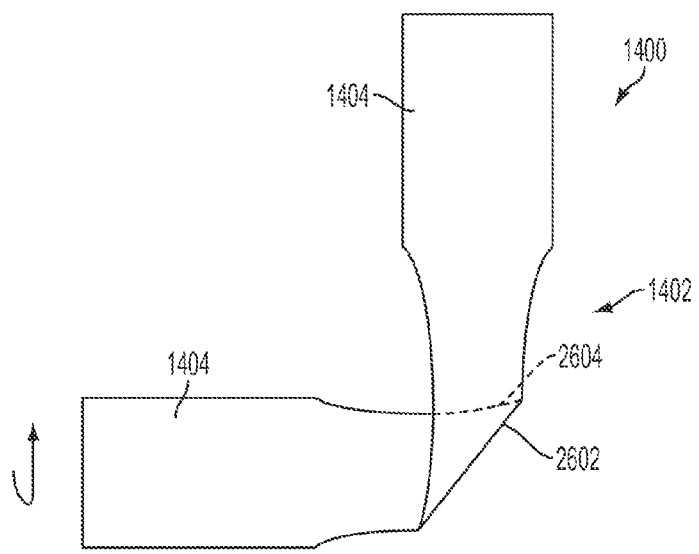
Figure 26C:
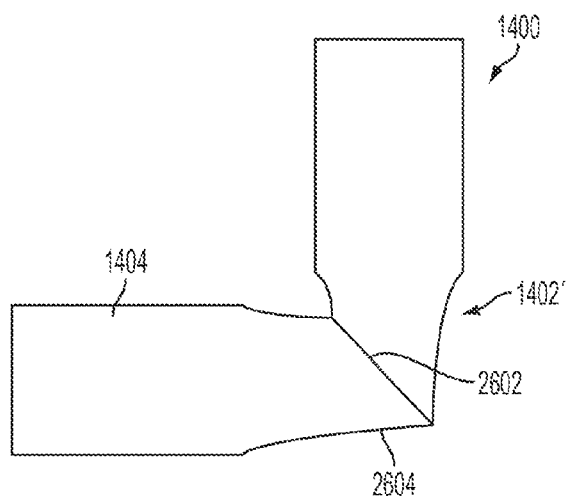

FIGS. 26a-26c show one embodiment of the battery structure 1400 illustrating an example method for generating a folded hinge, such as the hinge regions 2404, 2408. In FIG. 26a, the structure 1400 is shown in a flat position. The distance between the cell regions 1404 (e.g., the width of the hinge region 1402) may be sufficient to allow the described folds. First, the cell region 1404 on the left hand side of FIG. 26a may be folded along fold line 2602 to the position shown in FIG. 26b. In FIG. 26b, the fold line 2602 is shown as a completed fold. The fold along fold line 2602 may be about 180° in the sense that the right cell region 1404 may be substantially parallel to the left cell region 1404 both before and after the fold. In a plane parallel to the cell regions 1404, the fold may be offset, as shown, to rotate the position of the right cell region 1404 relative to the left cell region 1404. For example, the fold line 2602 may be oriented at an angle of about 45° relative to the cell regions 1404. From the position shown in FIG. 26b, the cell region 1404 on the left side of FIG. 26b may be rotated along fold line 2604 to the position shown in FIG. 26c. Fold line 2604 is illustrated in FIG. 26c as edge 2604. Fold 2602 is also visible in FIG. 26c. The result of the folds shown in FIGS. 26a-26c is the folded hinge region 1402', similar to the hinge regions 2404, 2408 described herein above.

Various embodiments may utilize perceived flexible battery structures. According to a perceived flexible battery implementation, a battery structure is installed in a device in a manner that allows the device to flex more than the battery or battery structure is flexed. For example, when the device is flexed to a given radius of curvature, the battery structure may be flexed to a greater radius of curvature. In this way, the stress on the battery structure may be lessened. In some embodiments, the battery structure may be essentially rigid. In other embodiments, the battery structure itself may have some degree of flexibility. For example, the battery or battery structure may utilize patterned active layers and/or other components and/or hinges as described herein.

Perceived flexibility may be achieved in any suitable manner. For example, the battery structure may be mounted within the device in a manner that allows the battery structure to remain rigid, while the device flexes, or relatively rigid compared to the device itself. Also, in some embodiments, the battery structure may be mounted in a portion of the device that is intended to be less flexible such as, for example, a central portion of the device. In this way, edge portions of the device may flex while the central portion remains more rigid.

Figure 27A:
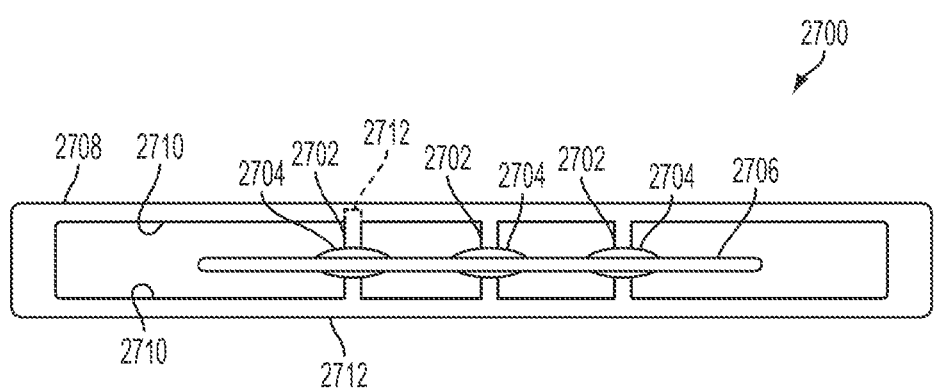
FIGS. 27a-27b show an open-sided diagram of one embodiment of a powered device comprising a battery structure mounted within the device to minimize flexing of the battery structure.
Figure 27B:
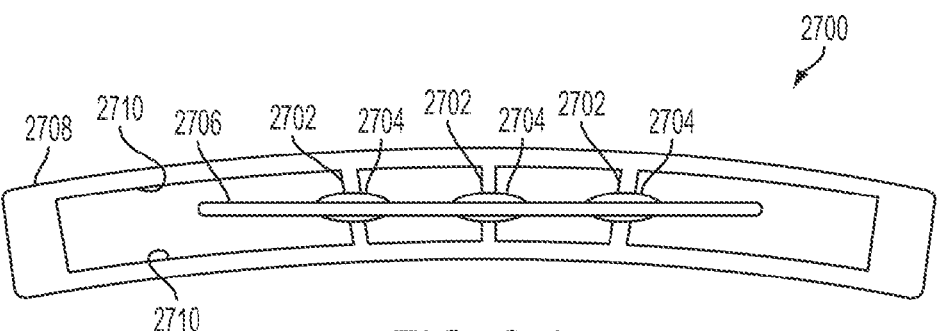

FIGS. 27a-27b show an open-sided diagram of one embodiment of a powered device 2700 comprising a battery structure 2706 mounted within the device 2700 to minimize flexing of the battery structure 2706. The device 2700 may be any suitable flexible device utilizing a battery or similar structure. For example, the device 2700 may be a flexible computing device, such as the device 100 described herein. The battery structure 2706 may be any suitable battery structure and may comprise some or all of a battery cell and/or a plurality of battery cells.

The device 2700 comprises a casing 2708 having an inner surface 2710. The battery structure 2706 is coupled to the inner surface of the casing 2710 utilizing one or more struts or pillars 2702. The struts 2702 are coupled to the battery structure at coupling points 2704. For example, the struts 2702 may extend through the battery structure 2706 and be secured at the coupling points 2704. The struts may be coupled to the inner surface 2710 of the casing 2708 in any suitable manner. For example, the struts 2702 may be an integral component of the inner surface 2710. Also, in some embodiments, inner surface 2710 may have recesses or slots, such as 2712, for receiving the struts 2702. Struts 2702 may be secured to the inner surface 2710, with or without recesses 2712, utilizing any suitable fastener and/or adhesive. It will be appreciated that any of the methods or mechanisms described herein for securing the struts 2702 to the casing 2708 may also be used to secure the struts 2702 to the battery structure 2706.

Flexibility of the battery structure 2700 relative to the casing 2708 may be provided by the struts 2702 and/or the coupling points 2704. In some embodiments, the struts 2702 may be made from a resilient material such as, for example, a rubber, a resilient polymer, etc. This may allow the struts 2702 to flex as the device 2700 flexes while allowing the battery structure 2702 to remain relatively flat. Also, in some embodiments, the coupling points 2704 may be comprised of a resilient material, again such as rubber and/or a resilient polymer. This may allow the struts 2702 to pivot relative to the battery structure 2706, further facilitating flexing of the device 2700 relative to the structure 2706. In some embodiments, the struts 2702 may be rigid or have the same material makeup as the material of the housing or casing 2708. For example, the struts 2702 may be integral components of the casing 2708 formed, for example, by injection molding. FIG. 27b shows the device 2700 flexed demonstrating a combination of flexure in the struts 2702 and flexure between the struts 2702 and the battery structure 2706 at the coupling points 2704. As illustrated, the casing 2708 flexes while the battery structure 2706 remains relatively rigid.

Figure 28A:
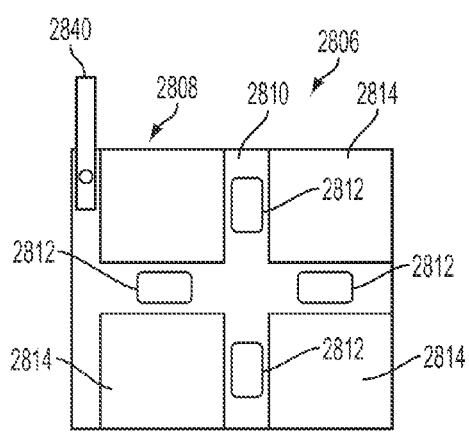
FIGS. 28a-28e show top-down views of one embodiment of a perceived flexible battery structure.

FIGS. 28a-28e show top-down views of one embodiment of a perceived flexible battery structure 2806. FIG. 28a shows one embodiment of the battery structure 2806 including a cathode layer 2808. The cathode layer 2808 may comprise various materials, for example, as described herein. The cathode layer 2808 may be coated, printed or deposited on a substrate 2810, which may be, for example, a current collector layer (e.g., with an optional adhesion layer there between). The substrate 2810 may have one or more punch-outs or other openings 2812. The openings 2812 may be at the position or positions of the coupling points where the structure 2806 is coupled to struts or pillars, for example, as described with respect to FIG. 27. As illustrated in FIG. 28a, the cathode layer 2808 comprises four cathode sections 2814, although there may be any suitable number of cathode sections 2814. In some embodiments, the cathode sections 2814 may be patterned, as described herein. Also, in some embodiments, the portion of the substrate 2810 between the cathode sections 2814 may serve as a hinge, as described herein, imparting flexibility to the structure 2806. A cathode electrode tab 2840 may be electrically coupled to the cathode layer 2808 and to all cathode layers in the structure 2806.

Figure 28B:
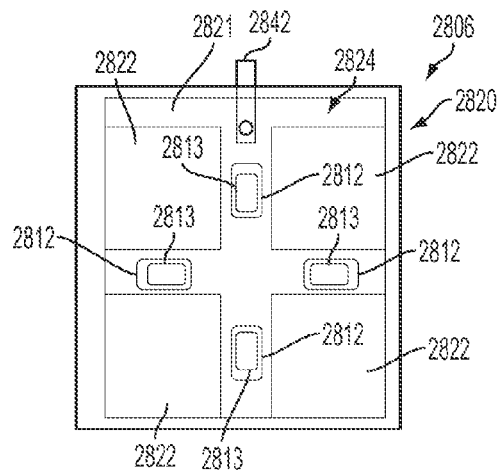

FIG. 28b shows a portion of the battery structure 2806 comprising an anode layer 2821 positioned on a substrate 2824 (e.g., a current collector) with an electrolyte/separator layer 2820. Openings 2812, 2813 are shown in the substrate 2824 and electrolyte/separator layer 2820, respectively and may match the openings 2812 in the substrate 2810 in FIG. 28a. An anode electrode tab 2842 may be electrically coupled to the anode layer 2821 and may be electrically coupled to the anode layer 2821 and to all anode layers in the structure 2806. As illustrated, the openings 2813 in the electrolyte/separator layer 2820 are smaller than the openings 2812 in the substrate 2824. This, for example, may minimize the risk of electrical contact between adjacent anode and cathode layers in the completed battery structure. The electrolyte/separator layer 2820, anode layer 2821 and substrate 2824 may comprise materials as described herein. In the example embodiment shown in FIG. 28b, the anode layer 2821 is divided into four anode sections 2822 that match the four cathode section 2814 shown in FIG. 28a. In various embodiments, the separator material may be slightly larger than the anode layer 2421 of the cathode layer 2808.

Figure 28C:
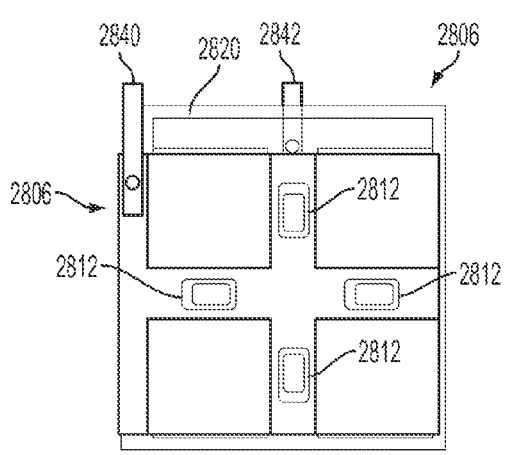
Figure 28D:
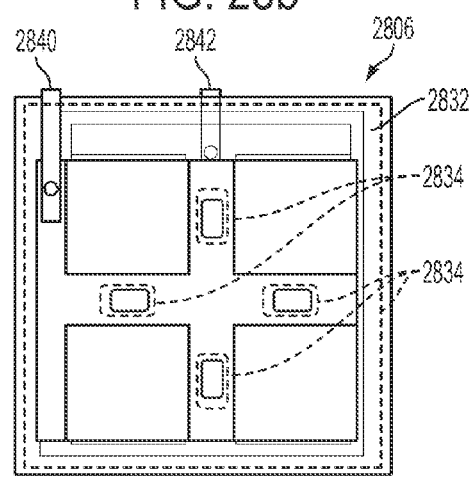
Figure 28E:
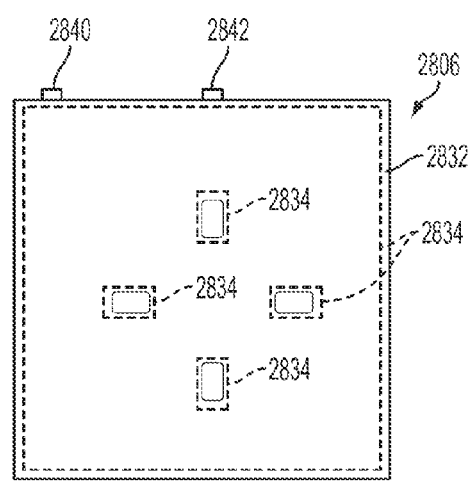

FIG. 28c shows the anode layer 2821 of FIG. 28b joined with the cathode layer 2808 of FIG. 28a with the electrolyte layer 2820 there between. It will be appreciated that the battery structure 2806 may comprise one or more examples of the various active material, current collector and electrolyte layers, for example, in a stacked our wound configuration. FIG. 28d shows the structure 2806 with a packaging layer 2832, shown in semi-transparently in FIG. 28d. Sealing lines 2834 where the packaging layer 2832 may be sealed are also shown. FIG. 28e shows the structure 2806 as illustrated in FIG. 28d with the packing layer 2832 shown in opaque form. For example, FIG. 28e may illustrate the structure 2806 after the packaging material has been removed or punched out for through-hole access while the battery package remains sealed.

Figure 29:
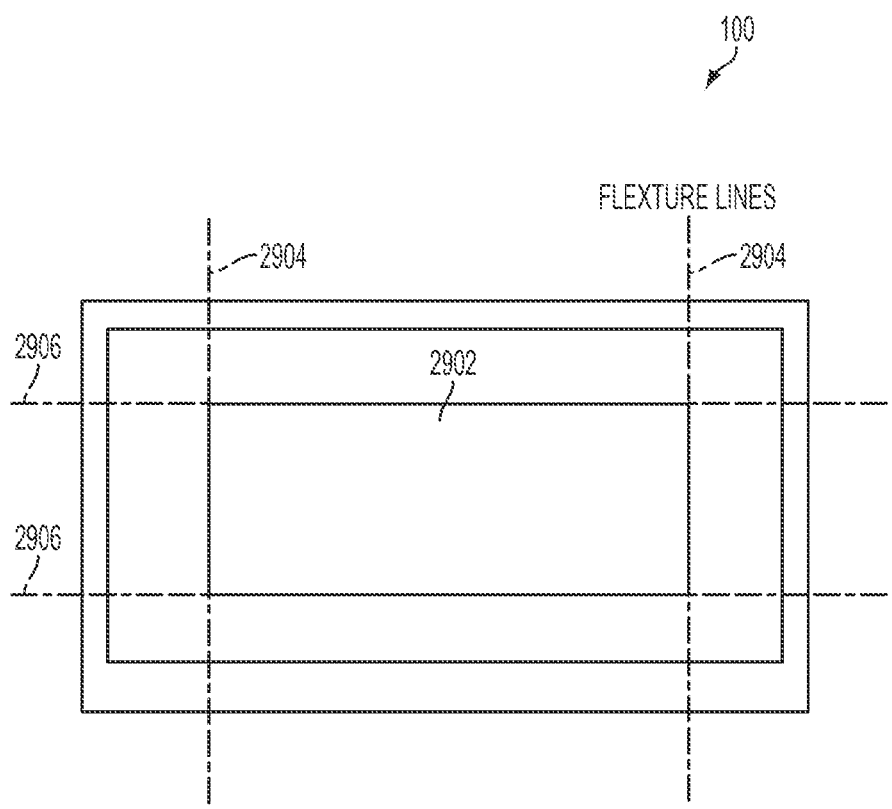
FIG. 29 shows one embodiment of the flexible computing device including a perceived flexible battery structure.

FIG. 29 shows one embodiment of the flexible computing device 100 including a perceived flexible battery structure 2902. The placement of the battery structure 2902 within the device 100 may cause the perceived flexibility. For example, the device 100 may flex along flexure lines 2904 and 2906, which are positioned at or near the edges of the battery structure 2902. In this way, flexing of the device 100 along the flexure lines 2904, 2095 may not cause significant flexing of the battery structure 2902. In some embodiments, the battery structure 2902 may be mounted within the device 100 utilizing struts or pillars in a manner similar to that described with respect to FIGS. 27 and 28. This may allow additional flexing of the device 100 without significant flexing of the structure 2902. For example, in embodiments utilizing struts or pillars, flexure lines 2904 may be moved closer to the center of the device 100.

Figure 30:
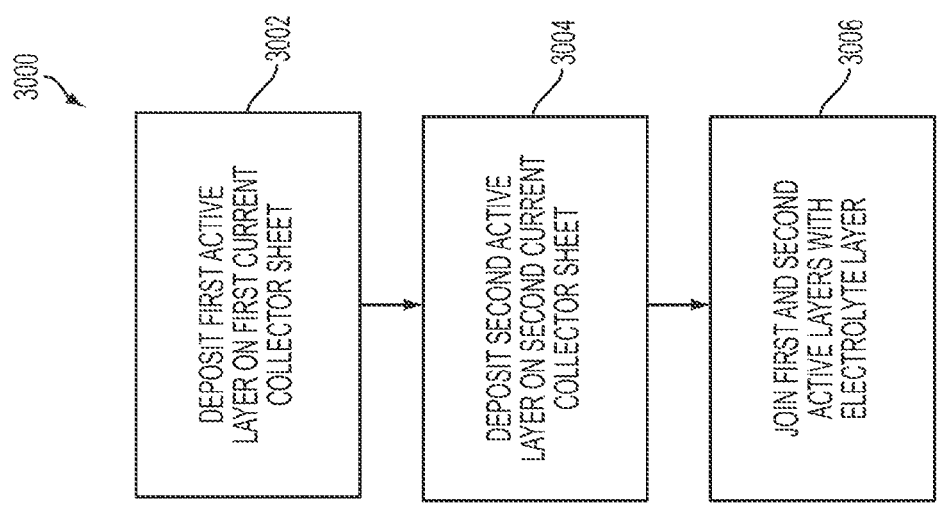
FIG. 30 is a flow chart showing one embodiment of a process flow for manufacturing a battery structure with a patterned active layer.

FIG. 30 is a flow chart showing one embodiment of a process flow 3000 for manufacturing a battery structure with a patterned active layer. The process may utilize a sheet of current collector material, similar to the sheet 1002 shown in FIG. 10. At 3002, an active layer may be deposited on the current collector sheet. In some embodiments, the active layer may be initially deposited as a wet coating. After a drying operation is applied, resulting in a dry coating, the active layer may be densified. In some embodiments, an adhesion layer is coated onto the current collector sheet before the active layer, for example, using wet coating and then drying techniques. The active layer may be patterned, for example, to comprise a plurality of active material portions and slots, similar to the active material portions 602 and slots 604 described herein above with respect to FIG. 6. The active layer may be made from any suitable active material and may be deposited according to any suitable manufacturing technique. Example manufacturing techniques that may be used include: roll-to-roll (R2R) or continuous patch coating, slot die coating, gravure coating, reverse gravure coating, off-set gravure coating, 3-roll coating, knife-over coating, screen-printing, ink-jet, dot-matrix, tape-casting, meniscus coating, spray coating, rod coating, or any other suitable method or combinations of methods.

For example, in some embodiments, some or all of these methods may be modified to include vibrations, coating head off-sets or shifts, air-knives or shims, frames that block or allow appropriate pattern transfer, etc. In some embodiments, the sheet with active material may be calendered to increase the density of the material. Electrode slitting may be used to remove edge-beads either before or after the calendering. Optionally, an additional active layer of the same kind as the first active layer (and optional adhesion layer) may be deposited on an opposite side of the current collector sheet, forming a structure similar to that shown in FIG. 11a.

At 3004, a second active layer may be deposited on a second sheet of current collector material. In some embodiments, the current collector material has an optional adhesion layer deposited before the second active layer. The second active layer may be the opposite of the first active layer. For example, when the first active layer is made from a cathode material, the second active layer may be made from an anode material. The second active layer may be, but need not be, patterned (e.g., comprise active material portions and slots). Optionally, an additional active layer of the same kind as the second active layer (and optional adhesion layer) may be deposited on an opposite side of the second sheet of current collector material. At 3006, the first and second active layers may be joined with a separator/electrolyte layer, as described herein, positioned between. The combined active and electrolyte layers may be formed into a battery structure. For example, multiple instances of the combined active and electrolyte layers may be positioned on one another to form a stacked battery structure. In some embodiments where the second active layer is patterned, the patterns on the first and second active layers may be aligned, as illustrated in FIG. 11a.

Figure 31:
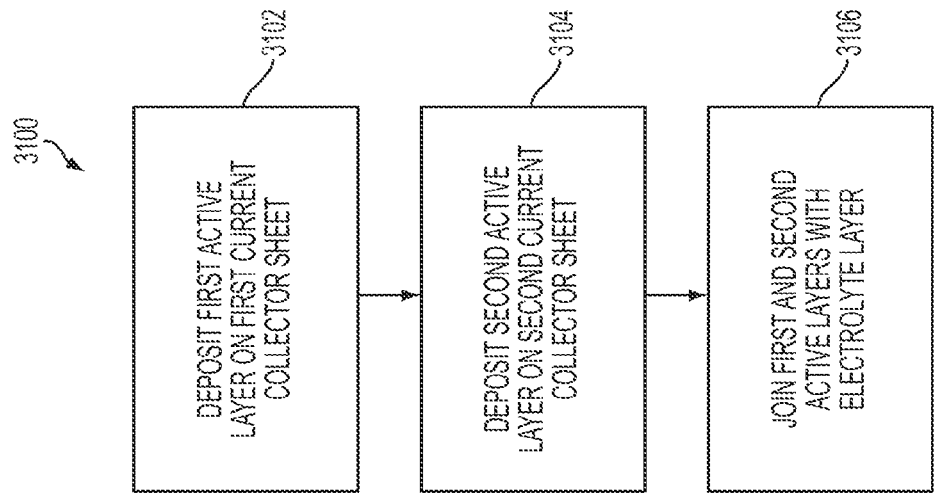
FIG. 31 is a flow chart showing one embodiment of a process flow for manufacturing a battery structure with a hinge.

FIG. 31 is a flow chart showing one embodiment of a process flow for manufacturing a battery structure with a hinge. The process may utilize a sheet of current collector material, for example, similar to the sheet 1002 shown in FIG. 10. At 3102, an active layer may be deposited on the current collector sheet. In some embodiments, the active layer may be patterned, as described herein. The active layer, however, may be discontinuous at a hinge region. For example, referring to FIG. 10, fold points 1006 may correspond to a hinge region. In some embodiments, an adhesion layer may be deposited on the current collector sheet prior to deposition of the active layer. Also, in some embodiments, an additional active layer of the same type as the first active layer may be deposited on the opposite side of the current collector material (e.g., with an optional adhesion layer) thus forming a double-sided active layer, for example, as described herein with respect to FIG. 11a. In some embodiments, after the active layer is deposited at 3102, the current collector sheet may be folded to form a hinge, for example, in the manner described herein with respect to FIGS. 23a-23d, 26a-26c, etc.

At 3104, a second active layer may be formed on a second sheet of current collector material (e.g., after an optional adhesion layer has been deposited). The second active layer may be patterned or un-patterned and may also be discontinuous at the hinge region. Folding at the hinge region may also be performed, in some embodiments, after the second active layer is formed at 3104. This is in addition to or instead of folding after 3102 described above. At 3106, the first and second active layers may be joined with at least one electrolyte/separator layer there between to form the battery structure. In various embodiments, the electrolyte layer may be continuous or discontinuous across the hinge region, for example, as described herein. Optionally, the resulting battery structure may be utilized to form a stacked and/or wound battery configuration, as described herein. For example, the structure may be wound by folding the structure at one of the hinge regions in manner similar to that described herein with respect to FIG. 11b. In some embodiments, prior to use, the battery construct is infiltrated with an electrolyte and cycled to activate (e.g., the electrolyte is added). The battery package may then be sealed.

Various figures herein show a flexible computing device 100 in conjunction with different embodiments of flexible battery structures, including FIGS. 1, 2, 12, 13, 22, 25, and 29. It will be appreciated that any of the configurations shown in these features may be utilized with any one or any combination of the various flexible battery structures described herein. Also, in addition to or instead of the flexible battery structures described herein, some battery materials, such as the anode and the cathode, could be tailored into nanostructured architectures (e.g. nanowires and nanoparticles), since the total elastic energy stored in nano-dimensional materials, in some embodiments, is not sufficient enough to induce crack initiation and propagation and may thereby introduce intrinsic flexibility of the active material.

It will be appreciated that the various cathodes as described herein may comprise any suitable material, depending on the chemistry of the battery. For example, in embodiments utilizing a Li-ion battery, the cathode may comprise a cathode material such as, for example, $LiCoO_2$, $Li_xV_2O_5$, $LiMn_2O_4$, $LiFePO_4$, $Li(Ni_xCo_yMn_z)O_2$, $Li(Ni_xCo_yAl_z)O_2$, $xLi_2MnO_3.(1-x)LiMO_2$, etc., and other suitable electronegative Li-ion host materials or mixed metal oxide and combinations of layered structures and off-stoichiometry thereof. In some embodiments, the cathode material may be joined with a conductive filler, such as carbon black, graphite, carbon nanotubes, graphene, and/or other electrically conductive nanostructures with low percolation threshold or other conductive polymers composites and/or combinations thereof. Any suitable binder may be used including, for example, binders comprising polyimide-based materials, poly(acrylic acid), polyethylene oxide, poly(vinyl alcohol), poly (vinylidene fluoride), carboxymethyl cellulose, polyvinyl pyrrolidone, polytetrafluoroethylene, styrene-butadiene, other co-polymers, other co-block polymers and/or combinations thereof and other binder agents that have high active-material adhesion energy, etc.

Similarly, the various anode layers described herein may comprise any suitable material, depending on the chemistry of the battery. In embodiments utilizing a Li-ion battery, for example, an anode may comprise carbon that may be in the form of graphite or amorphous carbon or hybrids. Other example anode materials include, Li metal, $Li_4Ti_5O_{12}$, Si, Ge, Sn, Sb, Al, Mg, etc., and other suitable electropositive Li-ion host materials and combinations of layered structures and off-stoichiometry thereof. The anode layer may also utilize a binder material, similar to that described above with respect to the cathode layer.

An electrolyte or electrolyte separator layer may comprise an electrolyte and a separator material or polymeric matrix material that may be later infiltrated with liquid or gel electrolyte composites including various filler materials for mechanical, thermal and ionic conductivity stability. The electrolyte may comprise any suitable electrolyte material including, for example, salts such as $LiBF_4$, $LiPF_6$, $LiClO_4$, $LiCF_3SO_3$, $LiNi(SO_2CF_3)_2$, $LiN(SO_2CF_2CF_3)_2$, etc., and combinations thereof as well as solvents, such as propylmethyl carbonate, ethylene carbonate, propylene carbonate, dimethyl carbonate, diethyl carbonate, butylene carbonate, ethylmethyl carbonate, dimethoxyethane, poly (ethylene glycol) dimethylether (various molecular weights) and mixtures thereof, and polymer backbones such as polyethylene oxide, polyimided based-materials, poly(acrylic acid), polyethylene oxide, poly(vinyl alcohol), poly (vinylidene fluoride), carboxymethyl cellulose, polyvinyl pyrrolidone, polytetrafluoroethylene, polyacrylonitrile, poly (methylmethacrylate), and combinations thereof. In some embodiments, the layer 306 may also comprise a filler and/or separator, which may serve to prevent direct shorting between anodes and cathodes. The separator may comprise, for example, polyethylene, polypropylene, or other porous yet chemically and electrically inert materials.

The current collector layers described herein may comprise conductive materials. In some embodiments, the conductive materials are selected based on the chemistry of the anode and cathode materials. For examine, in some Li-ion embodiments, the current collector layer may comprise aluminum and the current collector layer may comprise copper. Within the various layers, conductive adhesion or corrosive barriers could be used, as well as other interlayer laminates and gap fillers or electrical isolators. Packaging material for the battery may comprise various tri-laminated combinations of aluminum, nylon and PET or other hermetic and sealable packaging materials.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

What is claimed is:

1. A flexible battery structure, the battery structure comprising:
    a plurality of battery layers positioned substantially parallel to one another, wherein the plurality of battery layers comprises:
        a current collector layer;
        a first active layer; and
        an electrolyte layer comprising a first sub-layer and a second sub-layer;
    a first cell region;
    a second cell region;
    a third cell region;
    a fourth cell region;
    a first hinge region positioned between the first cell region and the second cell region, wherein a first portion of the plurality of battery layers is continuous across the first cell region, the second cell region and the first hinge region, wherein a second portion of the plurality of battery layers is discontinuous at the first hinge region, and wherein the first sub-layer and the second sub-layer overlap at the first hinge region; a second hinge region positioned between the third cell region and the second cell region: and a third hinge region positioned between the third cell region and the fourth cell region.

2. The battery structure of claim 1, wherein the current collector layer is substantially continuous across the first cell region, the second cell region and the first hinge region.

3. The battery structure of claim 2, wherein the electrolyte layer is substantially continuous across the first cell region, the second cell region and the first hinge region.

4. The battery structure of claim 1, wherein the first cell region is folded relative to the second cell region at the first hinge region.

5. The battery structure of claim 4, wherein the first cell region is folded towards the second cell region at a first fold characterized by a first angle and wherein the first cell region is folded away from the second cell region at a second fold characterized by a second angle, wherein a sum of the first angle and the second angle is about 180°.

6. The battery structure of claim 5, wherein the first cell region is folded towards the second cell region at a third fold characterized by a third angle and the first cell region is folded away from the second cell region at a fourth fold characterized by a fourth angle, wherein a sum of the third angle and the fourth angle is about 180°.

7. The battery structure of claim 5, wherein at least one of the first fold and the second fold modifies an angular position of the first cell region relative to the second cell region in a plane parallel to the first and second cell regions.

8. The battery structure of claim 4, wherein the first cell region is folded towards the second cell region at a first fold characterized by a first angle of about 180° and wherein the first cell region is folded away from the second cell region at a second fold characterized by a second angle of about 180°.

9. The battery structure of claim 1, wherein at least one layer selected from the first portion of the plurality of battery layers that is continuous across the first cell region has a length within the first hinge region that is greater than a length of the first hinge region.

10. The battery structure of claim 9, wherein the at least one layer is curved within the first hinge region.

11. The battery structure of claim 1, wherein the plurality of battery layers comprises a first packaging layer, a second packaging layer, and remaining battery layers, wherein the remaining battery layers are positioned between the first packaging layer and the second packaging layers.

12. The battery structure of claim 1, wherein the plurality of battery layers comprises a current collector layer and a first active layer positioned adjacent and substantially parallel to the current collector layer, wherein the current collector layer comprises a metal sheet, wherein the first active layer defines a plurality of active material portions positioned on the metal sheet and a plurality of slots, wherein each of the plurality of slots separates a set of at least two adjacent active material portions, and wherein the current collector layer is continuous across the first hinge region and the first active layer is discontinuous across the first hinge region.

13. The battery structure of claim 1, wherein the plurality of battery layers comprises an electrolyte layer, wherein the electrolyte layer comprises a thixotropic material.

14. A method of making a flexible battery structure, the method comprising:
    depositing a first active layer on a first sheet of current collector material, wherein the first active layer is discontinuous on the first sheet a first hinge region;
    depositing a second active layer on a second sheet of current collector material, wherein the second active layer is discontinuous on the second sheet at a second hinge region; and joining the first active layer and the second active layer with an electrolyte layer positioned between the first active layer and the second active layer, wherein the first hinge region and the second hinge region are aligned to form a combined hinge region, wherein the electrolyte layer comprises a first sub-layer and a second sub-layer, and wherein the joining comprises overlapping the first sub-layer and the second sub-layer overlap at the combined hinge region, wherein a portion of the first sub-layer in the first hinge region and a portion of the second sub-layer in the first hinge region comprise matrix material having a first concentration of electrolyte material that is lower than a second concentration of electrolyte material in the first and second sub-layers at the first and second cell regions.

15. The method of claim 14, wherein the first active layer comprises a plurality of active material portions and a plurality of slots, wherein each of the plurality of slots separates a set of at least two adjacent active material portions.

16. A flexible battery structure, the battery structure comprising:
   a plurality of battery layers positioned substantially parallel to one another;
   a first cell region;
   a second cell region; and
   a hinge region positioned between the first cell region and the second cell region, wherein a first portion of the plurality of battery layers is continuous across the first cell region, the second cell region and the hinge region, and wherein a second portion of the plurality of battery layers is discontinuous at the hinge region, wherein at least one layer selected from the first portion of the plurality of battery layers that is continuous across the first cell region has a length within the hinge region that is greater than a length of the hinge region.

17. The battery structure of claim 16, wherein the at least one layer is curved within the hinge region.

18. The battery structure of claim 16, wherein the plurality of battery layers comprises a current collector layer and a first active layer positioned adjacent and substantially parallel to the current collector layer, wherein the current collector layer comprises a metal sheet, wherein the first active layer defines a plurality of active material portions positioned on the metal sheet and a plurality of slots, wherein each of the plurality of slots separates a set of at least two adjacent active material portions, and wherein the current collector layer is continuous across the hinge region and the first active layer is discontinuous across the hinge region.

* * * * *

UNITED STATES PATENT AND TRADEMARK OFFICE
CERTIFICATE OF CORRECTION

PATENT NO.         : 9,502,734 B1                                        Page 1 of 1
APPLICATION NO.    : 14/223146
DATED              : November 22, 2016
INVENTOR(S)        : James Robert Lim et al.

It is certified that error appears in the above-identified patent and that said Letters Patent is hereby corrected as shown below:

Claim 1, Column 23, Line 60, replace ":" with ";".

Signed and Sealed this
Seventh Day of February, 2017

Michelle K. Lee
*Director of the United States Patent and Trademark Office*